(12) United States Patent
Fang et al.

(10) Patent No.: US 12,105,373 B2
(45) Date of Patent: Oct. 1, 2024

(54) DISPLAY MODULE AND DISPLAY DEVICE

(71) Applicant: Xiamen Tianma Micro-Electronics Co., Ltd., Xiamen (CN)

(72) Inventors: Liting Fang, Xiamen (CN); Peiqin Deng, Xiamen (CN); Ling Wu, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/091,084

(22) Filed: Dec. 29, 2022

(65) Prior Publication Data

US 2024/0142818 A1 May 2, 2024

(30) Foreign Application Priority Data

Nov. 1, 2022 (CN) .......................... 202211358284.2

(51) Int. Cl.
*G02F 1/1335* (2006.01)
*G02F 1/13363* (2006.01)
*G02F 1/1343* (2006.01)

(52) U.S. Cl.
CPC .. *G02F 1/133531* (2021.01); *G02F 1/133512* (2013.01); *G02F 1/133514* (2013.01); *G02F 1/13363* (2013.01); *G02F 1/134336* (2013.01)

(58) Field of Classification Search
None
See application file for complete search history.

(56) References Cited

U.S. PATENT DOCUMENTS

| | | | |
|---|---|---|---|
| 2001/0008464 A1* | 7/2001 | Ouderkirk | G02F 1/133536 359/489.15 |
| 2002/0017736 A1* | 2/2002 | Kausch | C08L 29/04 264/212 |
| 2010/0020265 A1* | 1/2010 | Senoue | G02F 1/13362 349/62 |
| 2015/0277012 A1* | 10/2015 | Nakamura | G02F 1/133528 359/489.07 |
| 2015/0369984 A1* | 12/2015 | Johnson | G02B 5/3083 427/163.1 |
| 2018/0164622 A1* | 6/2018 | Ono | G02F 1/136286 |

FOREIGN PATENT DOCUMENTS

CN 110543052 A 12/2019

* cited by examiner

*Primary Examiner* — Shan Liu
(74) *Attorney, Agent, or Firm* — Anova Law Group, PLLC

(57) ABSTRACT

A display module and a display device are provided. The display module includes a backlight module; a light control cell; a display liquid crystal cell; a first polarizer; a second polarizer; and a composite optical film. Along a thickness direction of the display module, the light control cell is disposed between the backlight module and the display liquid crystal cell and on a light-exiting surface of the backlight module; the first polarizer is disposed on a side of the display liquid crystal cell facing away from the light control cell; the second polarizer is disposed between the display liquid crystal cell and the light control cell; the composite optical film is disposed between the display liquid crystal cell and the backlight module; and the composite optical film is configured to transmit P-polarized light and reflect S-polarized light.

15 Claims, 15 Drawing Sheets

B-B

DISPLAY MODULE AND DISPLAY DEVICE

CROSS-REFERENCE TO RELATED APPLICATION

This application claims the priority of Chinese Patent Application No. 202211358284.2, filed on Nov. 1, 2022, the content of which is incorporated by reference in its entirety.

TECHNICAL FIELD

The present disclosure generally relates to the field of display technologies and, more particularly, relates to a display module and a display device.

BACKGROUND

From the cathode ray rube (CRT) era to the liquid crystal display (LCD) era, and now to the organic light-emitting diode (OLED) display era and light-emitting diode display era, the display industry has experienced decades of development and is changing with each passing day. The display industry has been closely related to our lives, from traditional mobile phones, tablets, TVs, and computers to current smart wearable devices, virtual reality devices, and vehicle displays. Electronic devices are inseparable from the display technologies.

With the development of the display technologies, people have higher and higher requirements for the display effects of display products, for example, high transmittance has become one of the important characteristics to measure the display effects. For the liquid crystal display products, especially display products with a double-cell structure, how to improve their transmittance has become one of the technical problems to be solved urgently at current stage. The present disclosed display modules and display devices are direct to solve one or more problems in the arts.

SUMMARY

One aspect of the present disclosure provides a display module. The display module may include a backlight module; a light control cell; a display liquid crystal cell; a first polarizer; a second polarizer; and a composite optical film. Along a first direction, the light control cell is disposed between the backlight module and the display liquid crystal cell and on a light-exiting surface of the backlight module, the first direction being a thickness direction of the display module; the first polarizer is disposed on a side of the display liquid crystal cell facing away from the light control cell; the second polarizer is disposed between the display liquid crystal cell and the light control cell; the composite optical film is disposed between the display liquid crystal cell and the backlight module; a transmission axis of the first polarizer is perpendicular to a transmission axis of the second polarizer; and the composite optical film is configured to transmit P-polarized light and reflect S-polarized light.

Another aspect of the present disclosure provides a display device. The display device may include a display module. The display module may include a backlight module; a light control cell; a display liquid crystal cell; a first polarizer; a second polarizer; and a composite optical film. Along a first direction, the light control cell is disposed between the backlight module and the display liquid crystal cell and on a light-exiting surface of the backlight module, the first direction being a thickness direction of the display module; the first polarizer is disposed on a side of the display liquid crystal cell facing away from the light control cell; the second polarizer is disposed between the display liquid crystal cell and the light control cell; the composite optical film is disposed between the display liquid crystal cell and the backlight module; a transmission axis of the first polarizer is perpendicular to a transmission axis of the second polarizer; and the composite optical film is configured to transmit P-polarized light and reflect S-polarized light.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Various exemplary embodiments of the present disclosure will now be described in detail with reference to the accompanying drawings. It should be noted that the relative arrangements of components and steps, numerical expressions and numerical values set forth in these embodiments do not limit the scope of the present disclosure unless specifically stated otherwise.

The following description of at least one exemplary embodiment is merely illustrative in nature and in no way taken as limiting the disclosure, its application or uses.

Techniques, methods and devices known to those of ordinary skill in the relevant art may not be discussed in detail, but where appropriate, such techniques, methods and devices should be considered part of the description.

In all examples shown and discussed herein, any specific values should be construed as exemplary only, and not as limitations. Therefore, other instances of the exemplary embodiment may have different values.

It will be apparent to those skilled in the art that various modifications and variations can be made in the present disclosure without departing from the spirit or scope of the disclosure. Therefore, the present disclosure is intended to cover the modifications and variations of the present disclosure falling within the scope of the corresponding claims (technical solutions to be protected) and their equivalents. It should be noted that, the implementation manners provided in the embodiment of the present disclosure may be combined with each other if there is no contradiction.

It should be noted that like numerals and letters denote like items in the following figures, therefore, once an item is defined in one figure, it does not require further discussion in subsequent figures.

Figure 1:
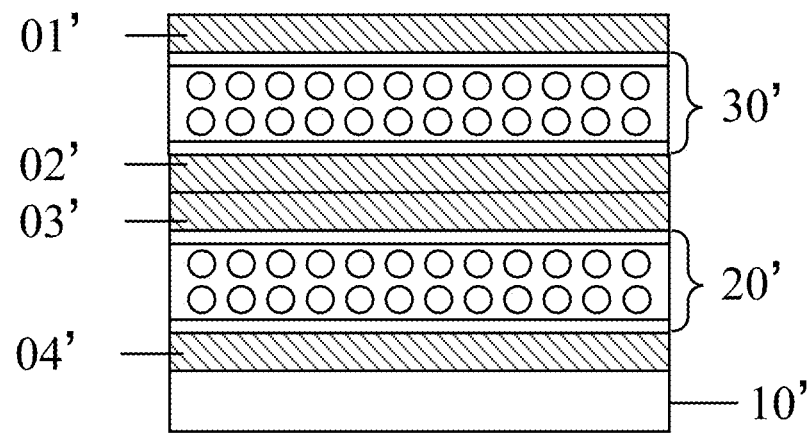
FIG. 1 illustrates a layer structure of a display module.

FIG. 1 is a schematic diagram of a film layer structurer of a display module. As shown in FIG. 1, the display module includes a backlight module 10', a light control cell 20' disposed on the light-exiting side of the backlight module 10' and a display liquid crystal cell 30' disposed on a side of light control cell 20' facing away from the backlight module 10'. A first polarizer 01' and a second polarizer 02' are respectively arranged on both sides of the display liquid crystal cell 30', and a third polarizer 03' and a fourth polarizer 04' are disposed on both sides of the light control cell 20', respectively. Although the light emitted by the backlight module 10' can be zonally adjusted through the light control cell 20', the premise is that two polarizers need to be introduced on both sides of the light control cell 20', and four polarizers need to be installed in the entire display module, which greatly affects the overall transmittance of the display module.

The present disclosure provides a display module and a display device. The display module may include a backlight module, a light control cell and a display liquid crystal cell. In a first direction, the light control cell may be disposed between the backlight module and the display liquid crystal cell, and the light control cell may be disposed on the light-exiting surface of the backlight module. The first direction may be the thickness direction of the display module. The display module may also include a first polarizer, a second polarizer and a composite optical film. The first polarizer may be disposed on a side of the display liquid crystal cell away facing from the light control cell, the second polarizer may be disposed between the display liquid crystal cell and the light control cell, and the composite optical film may be disposed between the display liquid crystal cell and the backlight module. The transmission axis of the first polarizer and the second polarizer may be perpendicular to each other; and the composite optical film may be configured to transmit the P-polarized light and reflect the S-polarized light. The reflected S-polarized light may be reflected back to the backlight module. After the light is reflected by the backlight module, the polarization direction may be changed and may be decomposed to form the P-polarized light and the S-polarized light and emitted to the composite optical film. Through this cycle, the effective utilization rate of the light-emitted by the backlight module may be greatly improved, and the amount of light emitted from the composite optical film may be increased. Accordingly, while introducing the light control cell to improve the contrast of the product, the introduction of the composite optical film may also be beneficial to improve the transmittance of the display module.

The above is the core idea of the present disclosure, and the technical solutions in the embodiments of the present disclosure will be clearly and completely described below in conjunction with the accompanying drawings in the embodiments of the present disclosure. Based on the embodiments of the present disclosure, all other embodiments obtained by persons of ordinary skill in the art without creative work belong to the protection scope of the embodiments of the present disclosure.

Figure 2:
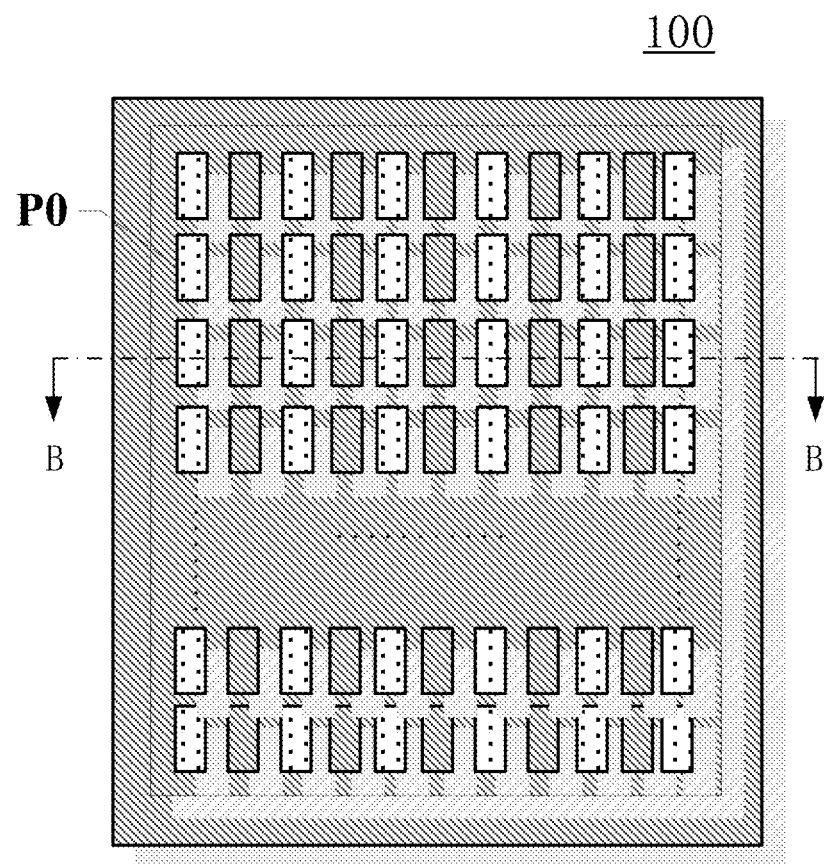
FIG. 2 illustrates a planar view of an exemplary display module according to various disclosed embodiments of the present disclosure.
Figure 3:
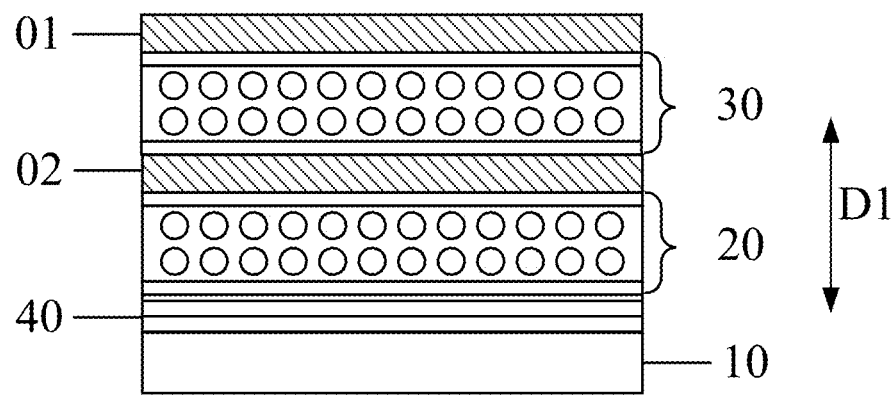
FIG. 3 illustrates an exemplary layer structure of a BB-sectional view of the display module in FIG. 2.

FIG. 2 is a schematic plan view of an exemplary display module according to various disclosed embodiments of the present disclosure, and FIG. 3 is an exemplary layer structure of a BB-section view of the exemplary display module in FIG. 2. As shown in FIGS. 2-3, a display module 100 may include a backlight module 10, a light control cell 20 and a display liquid crystal cell 30. Along a first direction D1, the light control cell 20 may be disposed between the backlight module 10 and the display liquid crystal cell 30, and the light control cell 20 may be on the light-exiting surface of the backlight module 10. The first direction D1 may be a thickness direction of the display module 100.

The display module 100 may also include a first polarizer 01, a second polarizer 02 and a composite optical film 40. The first polarizer 01 may be disposed on a side of the display liquid crystal cell 30 facing away from the light control cell 20, and the second polarizer 02 may be disposed between the liquid crystal cell 30 and the light control cell 20. The composite optical film 40 may be located between the display liquid crystal cell 30 and the backlight module 10. The transmission axes of the first polarizer 01 and the second polarizer 02 may be perpendicular to each other. The composite optical film 40 may be configured to transmit the P-polarized light and reflect the S-polarized light.

It should be noted that FIG. 2 only uses a display module with a rectangular structure as an example, and does not limit the shape of the display module. In some other embodiments of the present disclosure, the shape of the display panel may also be embodied in other forms, such as rounded rectangles, circles, or other possible shapes. FIG. 2 schematically illustrates the sub-pixels P0 included in the display module, and does not limit the number, arrangement, shape and size of the sub-pixels actually included in the display module. FIG. 3 only schematically shows the relative positional relationship of the backlight module 10, the light control cell 20 and the display liquid crystal cell 30 included in the display module, and does not show the detailed film structures of the backlight module 10, the light control cell 20 and the display liquid crystal cell 30, and the detailed film structure of each will be described in the following examples. In addition, FIG. 3 only shows a relative positional relationship of the backlight module 10, the light control cell 20, the display liquid crystal cell 30, the first polarizer 01, the second polarizer 02, and the composite optical film 40, and does not represent the actual film thickness. In one embodiment, the composite optical film 40 is a composite structure composed of multilayer optical films.

Figure 4:
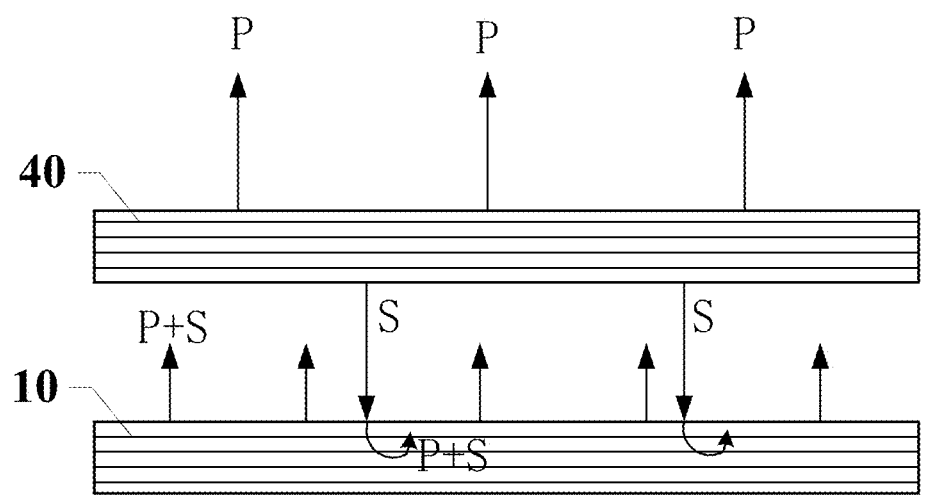
FIG. 4 illustrates a processing method of a composite optical film to light.

Further, referring to FIG. 2 and FIG. 3, in the display module 100, the light control cell 20 and the display liquid crystal cell 30 may be disposed on the light-exiting surface of the backlight module 10. The light control cell 20 may be disposed between the backlight module 10 and the display liquid crystal cell 30. The present disclosure utilizes the introduced light control cell 20 to regulate the light emitted by the backlight module 10 in partitions, and then transmits the light regulated by the light control cell 20 to the display liquid crystal cell 30 such that the black state picture displayed by the display liquid crystal cell 30 may be even blacker, thereby effectively improving the contrast of the display liquid crystal cell 30, and further helping to improve the display effect of the display liquid crystal cell 30. When four polarizers are introduced, since the principle of the polarizer is to allow light parallel to the transmission axis of the polarizer to pass through and absorb light from other directions, the light absorbed by the polarizer cannot be further utilized. Therefore, it is not conducive to improving the light utilization rate of the backlight module 10. However, the present disclosure introduces a composite optical film 40 between the display liquid crystal cell 30 and the backlight module 10, the composite optical film 40 may be configured to transmit the P-polarized light and reflect the S-polarized light. Referring to FIG. 4, the reflected S-polarized light may be able to reach the backlight module 10 again, and after this portion of light is reflected by the backlight module 10, the polarization direction may be changed, and may be decomposed to form the P-polarized light and the S-polarized light, which may be directed to the composite optical film 40. By such cycles, the effective utilization rate of the light emitted by the backlight module 10 may be greatly improved, and the amount of light emitted from the composite optical film 40 may be improved. Therefore, while the contrast of the product is improved by introducing the light control cell 20, the composite optical film 40 may also be conducive to improving the transmittance of the display module, thus effectively improving the display effect of the display product. FIG. 4 shows a schematic diagram of how the composite optical film 40 processes light.

Figure 5:
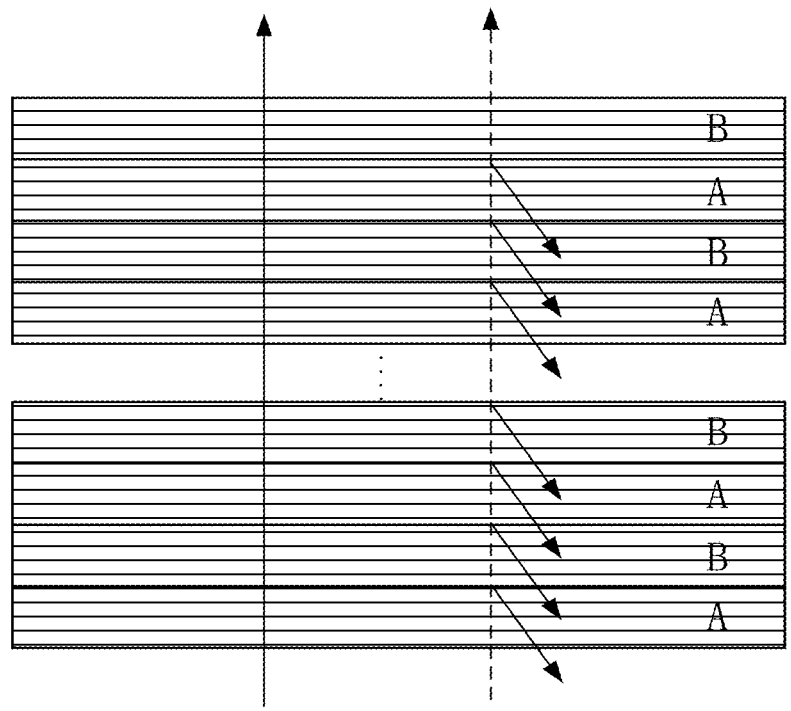
FIG. 5 illustrates an exemplary layer structure of a composite optical film of a display module according to various disclosed embodiments of the present disclosure.

FIG. 5 is a schematic diagram of a film layer structure of the composite optical film 40 in the display module provided by the embodiment of the present disclosure. In this embodiment, the first optical layers A and the second optical layers B included in the composite optical film 40 are illustrated, but it does not represent the actual number of the first optical layers A and the second optical layers B contained therein.

In one embodiment of the present disclosure, the composite optical film 40 may include first optical layers A and second optical layers B alternately arranged along the first direction D1. The refractive index of the first optical layer A may be n1, and the refractive index of the second optical layer B may be n2, $|n1-n2| \geq 0.05$.

Specifically, in the composite optical film 40 provided by the embodiment of the present disclosure, along the first direction D1, the first optical layers A and the second optical layers B may be alternately stacked, and the refractive indices of the first optical layer A and the second optical layer B may be different. According to the interface reflection formula, the reflectivity $R=(n1-n2)^2/(n1+n2)^2$. Thus, as the refractive index difference between the first optical layer A and the second optical layer B increases, the interface reflectivity may also increase. In one embodiment, the absolute value of the difference between the two refractive indices may be set to be greater than or equal to 0.05, which may effectively improve the reflectivity of the S-polarized light, thereby improving the effective utilization of the light emitted by the backlight module to improve the transmittance of the display module. In one embodiment, $n1=1.57$, and $n2=1.84$. In some other embodiments of the present disclosure, the above-mentioned refractive index values may also be selected as other values according to the actual thicknesses of the first optical layer A and the second optical layer B, and the present disclosure does not specifically limit it.

In one embodiment, the first optical layer A and the second optical layer B may be made of two different polymer materials respectively. The first optical layer A may be formed by a stretching process during molding to allow the refractive index in a certain axial direction to increase, and the refractive index in other axial direction to be a constant. The axial direction with the increased refractive index may be the non-transmission axis. The refractive indices of the second optical layer B may be same in all axial directions. The light whose polarization direction is the transmission axis direction may be guided to pass through the multilayer optical film, and the light whose polarization direction is along the non-transmission axis may have a speed and direction change due to the difference in refractive index between the adjacent first optical layer A and the second optical layer B, and finally may reach a total reflection angle such that the light travel direction may be reversed downward. The downward polarized light may change its polarization direction after being reflected and may pass through the first optical layers A and the second optical layers B in the composite optical film 40. During this process, the first optical layers A and the second optical layers B in the composite optical film 40 may have little absorption of polarized light, thus effectively improving the effective utilization rate of the light emitted by the backlight module 10 and improving the efficiency of the composite optical film 40. The amount of light emitted by the composite optical film 40 may be beneficial to improve the transmittance of the display module.

Alternatively, the first optical layer A may include polymethyl methacrylate (PMMA), or a copolymer of polymethyl methacrylate and other polymers, and the second optical layer B may include polyethylene terephthalate (PET), polyethylene naphthalate (PEN) or copolymers of polyethylene naphthalate and other polymers.

It should be noted that the composite optical film 40 may be formed in a manner of alternately stacking a single layer of the first optical layer A and a single layer of the second optical layer B. For example, except for the topmost and bottommost optical layers, along the direction D1, the second optical layer B may be disposed on both sides of the first optical layer A in other positions, and the first optical layer A may be respectively disposed on both sides of the second optical layer B.

In the display module provided by the embodiment of the present disclosure, the thickness of each first optical layer A included in the same composite optical film 40 may be same, and the thickness of each second optical layer B may be also same. The thicknesses of the first optical layer A and the second optical layer B may be the same or different, which is not specifically limited in the present disclosure.

In one embodiment of the present disclosure, in the same composite optical film 40, the total number of the first optical layers A and the second optical layers B may be N, 200≤N≤400, and N may be an integer.

Specifically, the greater the total number of the first optical layers A and the second optical layer B included in the composite optical film 40, the better the degree of polarization is, and the closer the degree of polarization is to that of the polarizer. However, if the total number of the first optical layers A and the second optical layers B is too large, for example, greater than 400, the overall light transmittance may be affected. If the total number of the first optical layers A and the second optical layers B is too small, for example, less than 200, the overall polarization degree of the composite optical film 40 may be affected. Therefore, in the embodiment of the present disclosure, when the total number of the first optical layers A and the second optical layers B in the same composite optical film 40 is set between 200 and 400, it may be beneficial to improve the polarization degree of the composite optical film 40, and its polarization degree may be closer to that of the polarizer, and it may also ensure the transmittance of the composite optical film 40, thereby improving the overall transmittance of the display module.

In another embodiment, the total number of the first optical layers A and the second optical layers B may satisfy 220≤N≤320, or, 260≤N≤300, etc., which is not specifically limited in the present disclosure. In the same composite optical film 40, the number of the first optical layers A and the second optical layers B may be the same. For example, when the total number of film layers is an even number, the number of the first optical layers A and the second optical layers B may be same. When the number of film layers is odd, the number of the first optical layers A and the number of the second optical layers B may be different, which is not specifically limited in the present disclosure.

Further, referring to FIG. 3, in one embodiment of the present disclosure, the display module may include at least one set of composite optical films 40. The at least one set of composite optical films 40 may be located between the light control cell 20 and the backlight module 10. The transmission axis of the composite optical films 40 may be perpendicular to the transmission axis of the second polarizer 02.

Specifically, in the display module shown in this embodiment, the composite optical film 40 may be disposed on the light-exiting surface of the backlight module 10, that is, between the backlight module 10 and the light control cell 20. The light emitted by the backlight module 10 may first strike the composite optical film 40, and then pass through the composite optical film 40 to the light control cell 20. Because the P-polarized light may pass through the composite optical film 40 and the S-polarized light may be reflected, the reflected S-polarized light may be directed to the backlight module 10, thereby greatly reducing light loss. Therefore, the method of arranging the composite optical film 40 adjacent to the backlight module 10 may be conducive to improving the amount of light reflected from the composite optical film 40 to the backlight module 10, and the polarization direction of the S-polarized light to the backlight module 10 may be changed, the amount of re-decomposition to form the P-polarized light and the S-polarized light may also be increased, and the reflected light may be effectively used to the greatest extent, which may be more conducive to improving the effective utilization of light and improving the overall transmittance of the display module.

It should be noted that when the composite optical film 40 is disposed between the backlight module 10 and the light control cell 20, the composite optical film 40 may be attached on the surface of the light control cell 20 facing the backlight module 10 through an adhesive material, or may be attached on the surface of the backlight module 10 facing the light control cell 20 by an adhesive material, which is not specifically limited in the present invention.

Figure 6:
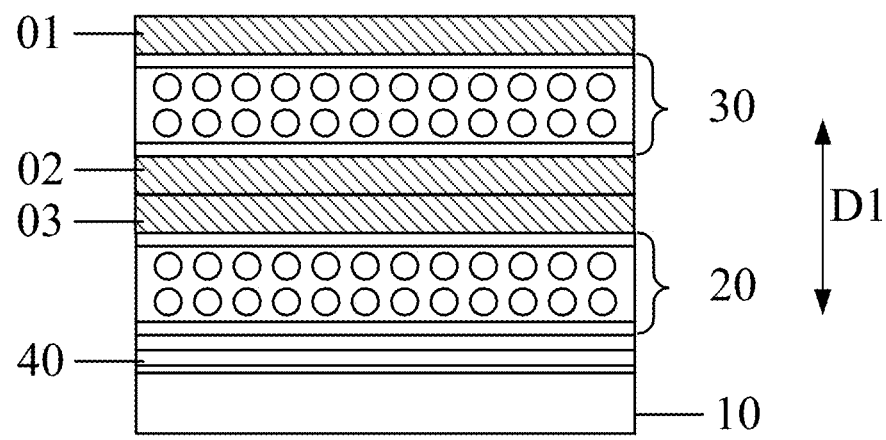
FIG. 6 illustrates another exemplary layer structure a BB-sectional view of the display module in FIG. 2.

FIG. 6 illustrates another BB-sectional view of the film layer structure of the display module in FIG. 2, and this embodiment shows a scheme of introducing a third polarizer into the display module.

As shown in FIG. 6, in one embodiment of the present disclosure, the display module may further include a third polarizer 03, and the third polarizer 03 may be disposed between the second polarizer 02 and the light control cell 20. A transmission axis of the third polarizer 03 may be parallel to the transmission axis of the second polarizer 02.

Specifically, this embodiment shows that the composite optical film 40 may be disposed on the side of the light control cell 20 facing the backlight module 10, and the third polarizer 03 may be introduced on the side of the light control cell 20 facing away from the backlight module 10. The degree of polarization of the polarizer may be relatively high, when the third polarizer 03 and the composite optical film 40 are respectively introduced on both sides of the light control cell 20, the introduction of the third polarizer 03 may effectively increase the degree of polarization of the light and improve the contrast of the display module. The introduction of the composite optical film 40 may be beneficial to improve the light utilization rate of the backlight module 10, thereby improving the overall transmittance of the display module. Therefore, when three polarizers and an optical control film are introduced into the same display module, the contrast and transmittance requirements of the display module may be taken into account, which may be more conducive to improving the overall display effect of the display module.

It should be noted that the number of the first optical layers A and the second optical layers B included in the composite optical film 40 in this embodiment may refer to the number range mentioned in the previous embodiment, and this embodiment will not repeat the limitation.

Figure 7:
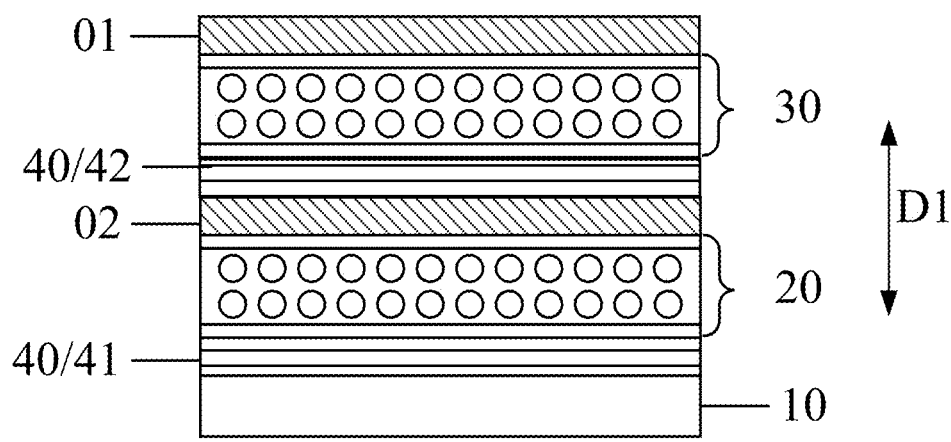
FIG. 7 illustrates another exemplary layer structure of a BB-sectional view of the display module in FIG. 2.

FIG. 7 illustrates another exemplary film layer structure of the display module along the BB direction in FIG. 2, and this embodiment shows a solution of two sets of composite optical films 40 in the display module.

As shown in FIG. 7, in one embodiment of the present disclosure, the composite optical film 40 may include a first composite optical film 41 and a second composite optical film 42. The first composite optical film 41 may be disposed between the light control cell 20 and the backlight module 10, and the second composite optical film 42 may be disposed between the display liquid crystal cell 30 and the light control cell 20. The transmission axis of the first composite optical film 41 may be parallel to the transmission axis of the first polarizer 01, and the transmission axis of the second the composite optical film 42 may be parallel to the transmission axis of the second polarizer 02.

Specifically, the embodiment shown in FIG. 7 may be equivalent to adding a group of composite optical films 40 on the basis of the embodiment shown in FIG. 3. Assuming that the composite optical film 40 disposed between the light control cell 20 and the backlight module 10 is the first composite optical film 41, and the other composite optical film 40 is a second composite optical film 42, at this time, the second composite optical film 42 may be disposed between the display liquid crystal cell 30 and the light control cell 20. When the first composite optical film 41 and the second composite optical film 42 are respectively introduced on both sides of the light control cell 20, the first composite optical film 41 may directly receive the light emitted by the backlight module 10, and retransmit the reflected S-polarized to the backlight module 10 to improve the light efficiency of the backlight module 10 and increase the amount of light passing through the first composite optical film 41. After the light passing through the first composite optical film 41 is directed to the light control cell 20, it may be directed to the second composite optical film 42, and the second composite optical film 42 may also fully and effectively utilize the light to improve the light utilization rate of the backlight module 10.

The polarization degree of the polarizer itself may be relatively higher, but the transmittance may be relatively low. In the related art, referring to FIG. 1, a first polarizer 01' and a second polarizer 02' may be respectively arranged on both sides of the display liquid crystal cell 30', and a third polarizer 03 and a fourth polarizer 04' are respectively disposed on both sides of the light control cell 20'. Four polarizers lead to low overall transmittance of the display module. To ensure the degree of polarization, this embodiment retains the first polarizer 01 on the side of the display liquid crystal cell 30 facing away from the light control cell 20, and replaces the two polarizers between the display liquid crystal cell 30 and the backlight module 10 with the first composite optical film 41 and the second composite optical film 42, respectively, and retain the second polarizer 02 between the display liquid crystal cell 30 and the light control cell 20. Accordingly, by utilizing the characteristics of the higher degree of polarization that the first polarizer 01 and the second polarizer 02 have, the contrast of the display module may be ensured. At the same time, the first composite optical film 41 and the second composite optical film 42 may have higher transmittance characteristics, the transmittance of the display module may be improved. Accordingly, the display module provided by the present disclosure may have a certain contrast while taking into account a high transmission rate. In addition, because the cost of the polarizer may be relatively high, when a portion of the polarizer is replaced by a composite optical film, it may also be beneficial to reduce the overall production cost of the display module.

When the first composite optical film 41 and the second composite optical film 42 are respectively introduced on the upper and lower sides of the light control cell 20, the structures of the first composite optical film 41 and the second composite optical film 42 be referred to the structure of the composite optical film 40 in the above-mentioned embodiments (for example, FIG. 5). For example, the first optical layers A and the second optical layers B may be alternately stacked. The total number of the first optical layers A and the second optical layers B included in the first composite optical film 41 and the second composite optical film 42 may also be referred to the total number of the first composite optical film 41 and the second composite optical film 42 in the composite optical film 40 in the foregoing embodiments, which is not specifically limited in the present disclosure.

Figure 8:
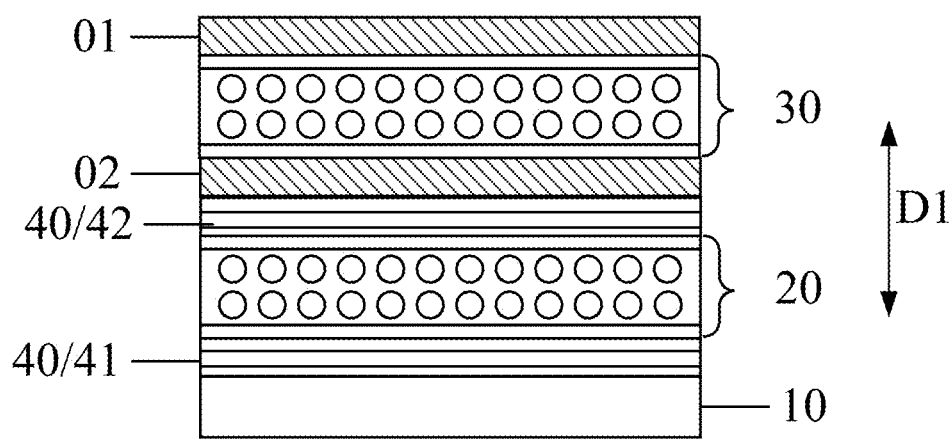
FIG. 8 illustrates another exemplary layer structure of a BB-sectional view of the display module in FIG. 2.

In another embodiment of the present disclosure, referring to FIG. 7, the second composite optical film 42 may be disposed between the display liquid crystal cell 30 and the second polarizer 02, or referring to FIG. 8, the second composite optical film 42 may be disposed between the second polarizer 02 and the light control cell 20. FIG. 8 shows another exemplary layer structure of the display module along the BB direction in FIG. 2.

Specifically, because the second polarizer 02 may be originally disposed between the display liquid crystal cell 30 and the light control cell 20, when the second composite optical film 42 is introduced between the display liquid crystal cell 30 and the light control cell 20, it may be equivalent to that the second polarizer 02 and the second composite optical film 42 are simultaneously introduced between the display liquid crystal cell 30 and the light control cell 20. At this time, the second composite optical film 42 may be adjacent to the display liquid crystal cell 30, and the second polarizer 02 may be disposed adjacent to the light control cell 20. Because the polarization degree of the second polarizer 02 may be higher, when the second polarizer 02 is disposed adjacent to the light control cell 20, the second polarizer 02 may provide light with a higher degree of polarization to the second composite optical film 42. Accordingly, the cooperation of the first composite optical film 41, the second composite optical film 42, the first polarizer 01 and the second polarizer 02 may be beneficial to improve the overall contrast and penetration of the display module.

In some embodiment, the structure shown in FIG. 8 may also be adopted. At this time, the second polarizer 02 may be adjacent to the display liquid crystal cell 30, and the second composite optical film 42 may be adjacent to the light control cell 20 to reduce the number of film layers between the second composite optical film 42 and the light control cell 20 to reduce the amount of the S-polarized light reflected by the second composite optical film 42 and absorbed by other film layers. Thus, the effective use ratio of light may be improved, and the overall transmission rate of the display module may be improved.

Continuing to refer to FIG. 5, FIG. 7 or FIG. 8, in one embodiment of the present disclosure, the total number of the first optical layers A and the second optical layers B included in the first composite optical film 41 may be N1, the total number of the first optical layers A and the second optical layers B included in the second composite optical film 42 may be N2, and N1>N2.

For the display module as a whole, the first polarizer 01 disposed on the side of the display liquid crystal cell 30 facing away from the light control cell 20 and the first composite optical film 41 located on the side of the light control cell 20 facing away from the display liquid crystal cell 30 may be the factors that determine the overall contrast the display module. Because the first polarizer 01 may have a higher degree of polarization, the higher the degree of polarization of the first composite optical film 41 is, the more favorable it is to improve the overall contrast of the display module. Considering that the degree of polarization of the first composite optical film 41 may be positively related to the total number of layers of the first optical layers A and the second optical layers B included therein, when the present disclosure sets the total number N1 of the first optical layer A and the second optical layer B included in the first composite optical film 41 to be relative large, the effect of improving the overall contrast of the display module may be better. Further, considering that the second composite optical film 42 and the second polarizer 02 may be disposed between the display liquid crystal cell 30 and the light control cell 20, and the absorption axes of the two may be same, and the second polarizer 02 may have a better degree of polarization, thus the polarization requirement of the second composite optical film 42 may be appropriately reduced. For example, when the total number N2 of the first optical layers A and the second optical layers B included in the second composite optical film 42 is appropriately reduced, for example, less than N1, the overall contrast and transmittance of the display module may be guaranteed without causing the total thickness of the display module to be too large.

Figure 9:
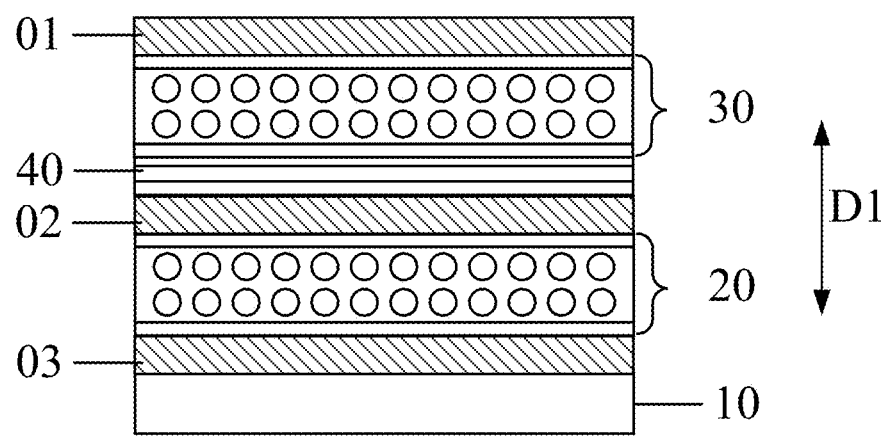
FIG. 9 illustrates another exemplary layer structure of a BB-sectional view of the display module in FIG. 2.

FIG. 9 shows another exemplary film layer structure of the display module along the BB direction in FIG. 2. This embodiment shows the scheme of introducing three polarizers and a group of composite optical films 40 into the display module.

As shown in FIG. 9, in one embodiment of the present disclosure, the display module may include at least one set of composite optical films 40 and a third polarizer 03. The composite optical film 40 may be disposed between the display liquid crystal cell 30 and the light control cell 20. The third polarizer 03 may be disposed between the light control cell 20 and the backlight module 10. The composite optical film 40 may be parallel to the transmission axis of the second polarizer 02, and the transmission axis of the third polarizer 03 may be parallel to the transmission axis of the first polarizer 01.

Specifically, this embodiment shows the solution of introducing the third polarizer 03 between the light control cell 20 and the backlight module 10, and introducing the composite optical film 40 between the display liquid crystal cell 30 and the light control cell 20. After the light emitted by the backlight module 10 passes through the action of the third polarizer 03, the light with a better polarization may be formed and supplied to the light control cell 20. In this embodiment, the first polarizer 01 located on the side of the display liquid crystal cell 30 facing away from the light control cell 20 and the third polarizer 03 located on the side of the light control cell 20 facing away from the display liquid crystal cell 30 may determine the overall contrast of the display module. The polarizers in this disclosure may have better polarizing properties, thus the method of setting the first polarizer 01 and the third polarizer 03 on the light-exiting surface of the display liquid crystal cell 30 and the light incident surface of the light control cell 20 may be conducive to improving the overall contrast of the display module. At the same time, this embodiment may introduce the composite optical film 40 between the display liquid crystal cell 30 and the light control cell. Because the composite optical film 40 may transmit the P-polarized light and reflect the S-polarized light, the reflected S-polarized light may be reused. Thus, it is beneficial to improve the overall light utilization rate and transmittance of the display module. Therefore, the approach of disposing the polarizer on the light-exiting surface of the display liquid crystal cell 30 and the light-incident surface of the light control cell 20, and introducing the composite optical film 40 between the display liquid crystal cell 30 and the light control cell 20 may ensure the contrast of the display module while taking into account the transmittance of the display module. Thus, the overall display effect of the display module may be improved.

Figure 10:
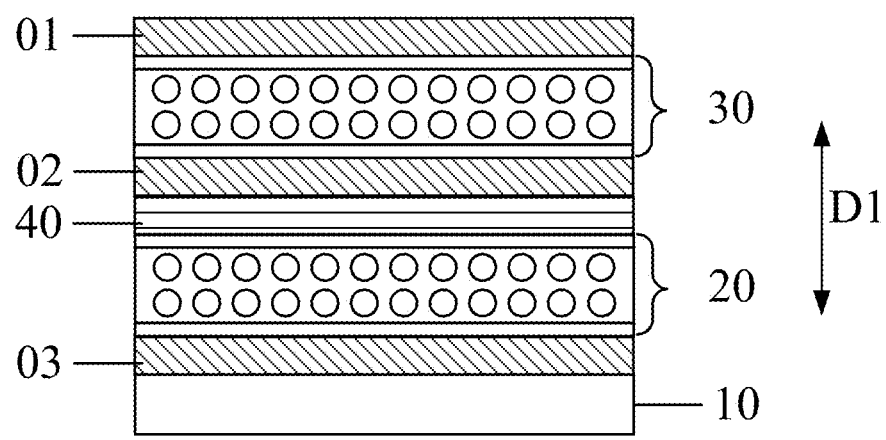
FIG. 10 illustrates another exemplary layer structure of a BB-sectional view of the display module in FIG. 2.

In one embodiment of the present disclosure, referring to FIG. 9, the composite optical film 40 may be disposed between the display liquid crystal cell 30 and the second polarizer 02. In another embodiment, referring to FIG. 10, the composite optical film 40 may be disposed between the second polarizer 02 and the light control cell 20. FIG. 10 shows another exemplary layer structure of the display module shown in FIG. 2 along the BB direction.

Specifically, when the composite optical film 40 is disposed between the display liquid crystal cell 30 and the light control cell 20, the second polarizer 02 and the composite optical film 40 may be simultaneously disposed between the display liquid crystal cell 30 and the light control cell 20. The embodiment in FIG. 9 further shows the scheme of disposing the composite optical film 40 between the display liquid crystal cell 30 and the second polarizer 02. The light emitted by the backlight module 10 may be affected by the polarization of the third polarizer 03 and the second polarizer 02, the degree of polarization of the light provided to the composite optical film 40. When the polarized light with the higher degree of polarization is transmitted to the composite optical film 40, the composite optical film 40 may make full use of this portion of the light to transmit the P-Polarized light, and reflect the S-polarized light. The reflected S-polarized light may be further utilized to increase the amount of light provided by the composite optical film 40 to the display liquid crystal cell 30, thus meeting the requirements of the display module for contrast and transmittance.

The embodiment in FIG. 10 shows a scheme in which the composite optical film 40 is disposed between the second polarizer 02 and the light control cell 20. In such a configuration, the light regulated by the light control cell 20 may first irradiate to the composite optical film 40, and then to the second polarizer 02. When the light first strikes the composite optical film 40, the S-polarized light reflected in the composite optical film 40 may not need to pass through the second polarizer 02, which may be equivalent to reducing the number of film layers that the S-polarized light reflected by the composite optical film 40 needs to pass through when irradiating the backlight module 10. Thus, more S-polarized light may be reflected back to the backlight module 10 for reuse. Therefore, this method may be conducive to improving the light utilization rate of the backlight module 10 and improving the overall transmitting rate of the display module.

Figure 11:
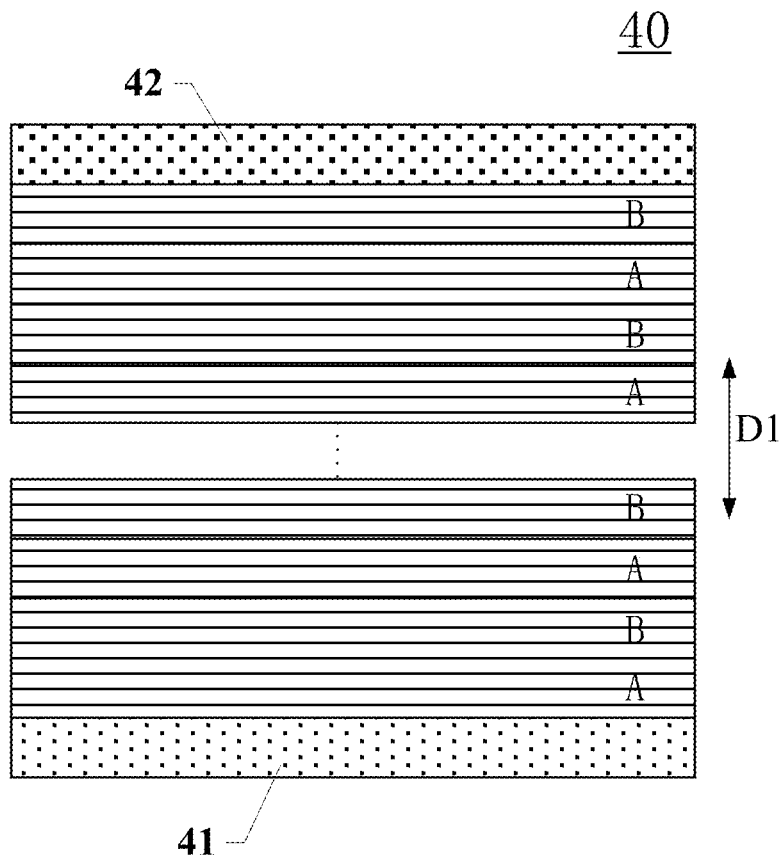
FIG. 11 illustrates another exemplary layer structure of a composite optical film of a display module according to various disclosed embodiments of the present disclosure.

FIG. 11 is a schematic diagram of another exemplary film layer of the composite optical film 40 in the display module provided by the embodiment of the present disclosure. This embodiment shows a scheme in which the composite optical film 40 may include a protective layer 41 and a diffusion layer 42.

As shown in FIG. 11, in one embodiment of the present disclosure, the composite optical film 40 may further include a protective layer 41 and a diffusion layer 42. Along the first direction D1, the first optical layer A and the second optical layer B may be disposed between the protective layer 41 and the diffusion layer 42, and the protective layer 41 may be disposed between the diffusion layer 42 and the backlight module 10.

Specifically, the composite optical film 40 in the embodiment of the present disclosure may include the protective layer 41, and the first optical layer A and the second optical layer B may be stacked on one side surface of the protective layer 41. Assuming that the composite optical film 40 may include a light-incident surface and a light-exiting surface opposite along the first direction D1, the protective layer 41 may be disposed on the light-incident surface of the composite optical film 40, the diffusion layer 42 may be disposed on the light-exiting surface of the composite optical film 40, and the first optical layer A and the second optical layer B may be alternately disposed between the protective layer 41 and the diffusion layer 42. When the diffusion layer 42 is provided on the light-exiting surface of the composite optical film 40, the diffusion layer 42 may play the role of uniform light. The light emitted through the diffusion layer 42 may be a uniform surface light source such that the composite optical film 40 may be used to enhance the display module, while improving the overall transmittance, and it may also be beneficial to improve the overall brightness uniformity of the display module.

Figure 12:
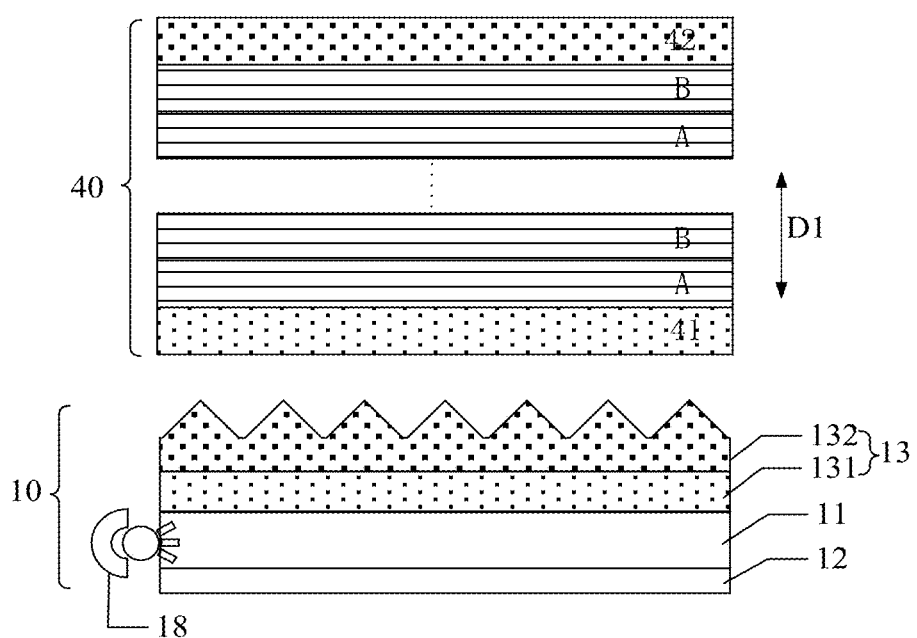
FIG. 12 illustrates an exemplary layer structure of a backlight module and a composite optical film of a display module according to various disclosed embodiments of the present disclosure.

FIG. 12 is a schematic diagram of an exemplary film layer structure of the backlight module 10 and the composite optical film 40 in the display module provided by the embodiment of the present disclosure. In this embodiment, the configuration that the backlight module 10 is an edge-type backlight module 10 is used an example. As shown in FIG. 12, the backlight module 10 may not include the diffusion layer 42.

Specifically, when the diffusion layer 42 is provided in the composite optical film 40 to provide a uniform surface light source to the display liquid crystal cell 30, the diffusion layer 42 may no longer be provided in the backlight module 10, thereby facilitating the simplification of the structure of the backlight module 10, and the production cost of the backlight module 10 may be reduced.

In one embodiment, as shown in FIG. 12, the backlight module 10 may include a light guide plate 11, a light source 18 disposed on a side surface of the light guide plate 11, a reflective layer 12 disposed on a first side of the light guide plate 11 along the first direction D1, and a prism film 13 disposed on a second side of the light guide plate 11 along the first direction D1. The first side is opposite to the second side, and the first side is the side of the light guide plate 11 away from the composite optical film 40. In one embodiment, the prism film 13 may include a first prism film 131 and a second prism film 132. When the extension direction of the prism in the first prism film 131 and the prism in the second prism film 132 are orthogonal, by utilizing the principle of refraction and total reflection of light by the prism, the arrangement of the two-layer prism film may be conducive to increasing the utilization rate of the light incident to the prism film. Among the light directed to the first prism film 131 and the second prism film 132, a portion of the light may be reused after being reflected by the prism structure, and another portion of the light may be gathered towards the center to achieve a brightening effect.

The embodiment of FIG. 12 is illustrated by taking the side-type backlight module 10 as an example. The cost of the side-type backlight module 10 may be relatively low, and it is beneficial to save the production cost of the display module.

Figure 13:
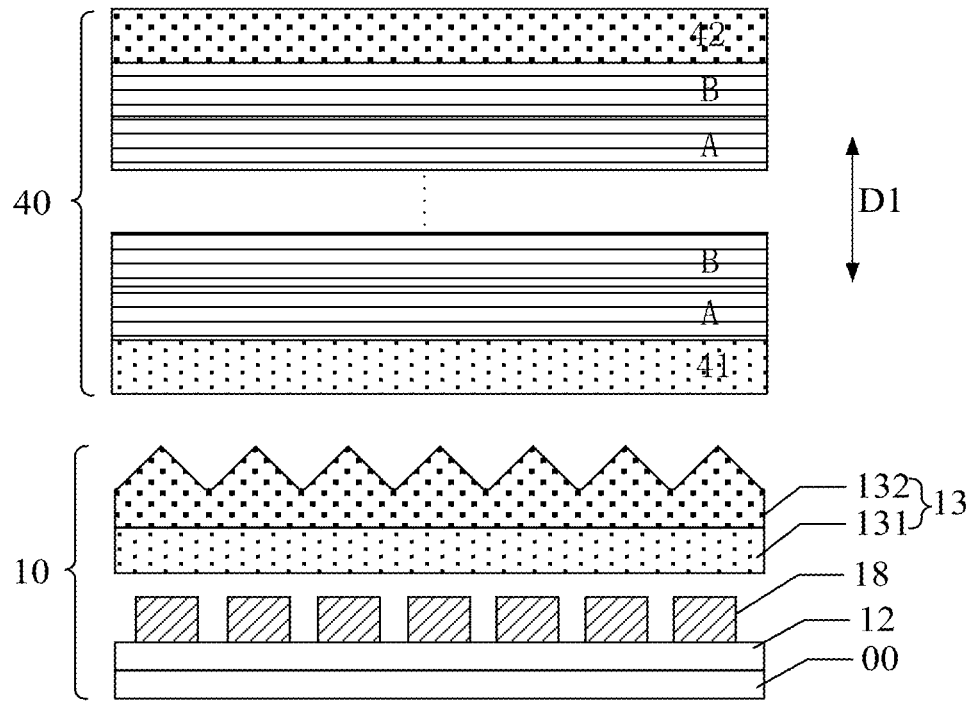
FIG. 13 illustrates another exemplary layer structure of a backlight module and a composite optical film of a display module according to various disclosed embodiments of the present disclosure.

In some other embodiments of the present disclosure, the backlight module 10 may also be a direct-lit backlight module 10, an example is illustrated in FIG. 13. FIG. 13 shows a schematic diagram of another film layer structure of the backlight module 10 and the composite optical film 40 in the display module provided by one embodiment of the present disclosure.

As shown in FIG. 13, the backlight module 10 may include a substrate 00, a reflective layer 12 disposed on a side of the substrate 00, a light source 18 disposed on the side of the reflective layer 12 facing away from the substrate 00, a prism film 13 is disposed on the side of the light source 18 facing away from the substrate 00. The structure of the prism film 13 may be referred to the structure of the prism film 13 in the embodiment of FIG. 12, which will not be repeated in this embodiment. When the direct-lit backlight module 1010 is used, the light source 18 may adopt mini-LED, which may be beneficial to realize the divisional control of the light in the display area, and may realize the pixel-level control of the light together with the light control cell 20. Accordingly, it may be beneficial to improve the contrast of the display module.

Figure 14:
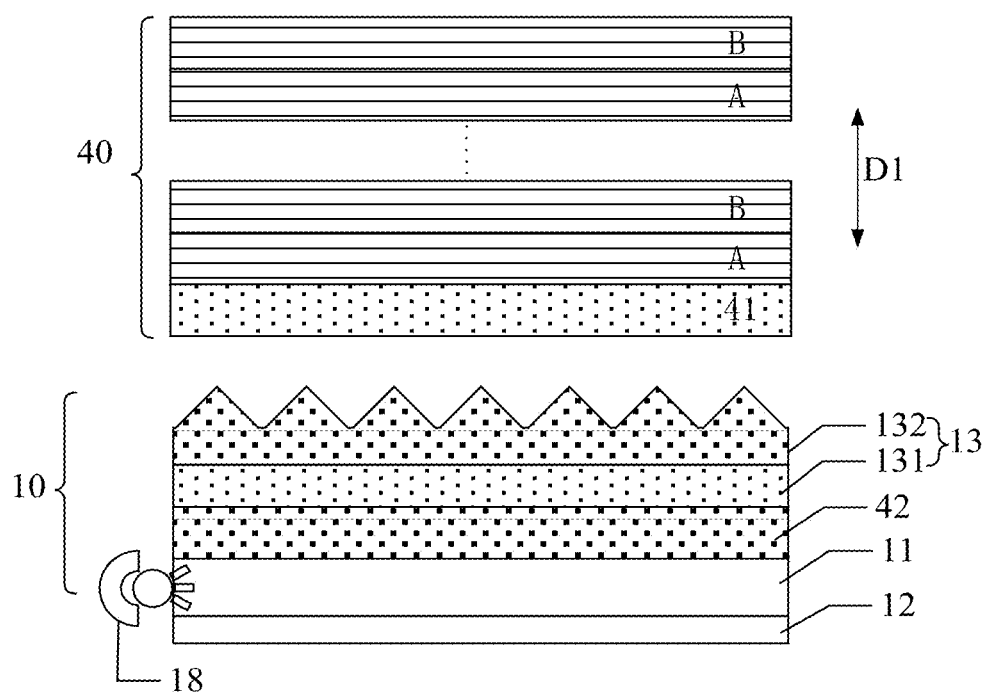
FIG. 14 illustrates another exemplary layer structure of a backlight module and a composite optical film of a display module according to various disclosed embodiments of the present disclosure.

In some other embodiments of the present disclosure, the composite optical film 40 introduced in the display module may not include the diffusion layer 42. At this time, the backlight module 10 may be provided with the diffusion layer 42, an example is illustrated in FIG. 14. FIG. 14 is a schematic diagram of another film layer structure of the backlight module 10 and the composite optical film 40 in the display module provided by one embodiment of the present disclosure.

As shown in FIG. 14, in one embodiment, the backlight module 10 may include a light guide plate 11, a light source 18 disposed on a side surface of the light guide plate 11, a reflective layer 12 disposed on a first side of the light guide plate 11 along the first direction D1, a diffusion layer 42 disposed on a second side of the light guide plate 11 along the first direction D1, and a prism film 13 disposed on the side of the diffusion layer 42 facing away from the light guide plate 11. The structure of the prism film 13 in this embodiment may be referred to the structure of the prism film 13 in the embodiment of FIG. 12. When the diffusion layer 42 is disposed on the backlight module 10, the backlight module 10 may also provide a uniform surface light source 18 to the display liquid crystal cell 30 to improve the uniformity of the overall display brightness of the display module.

Figure 15:
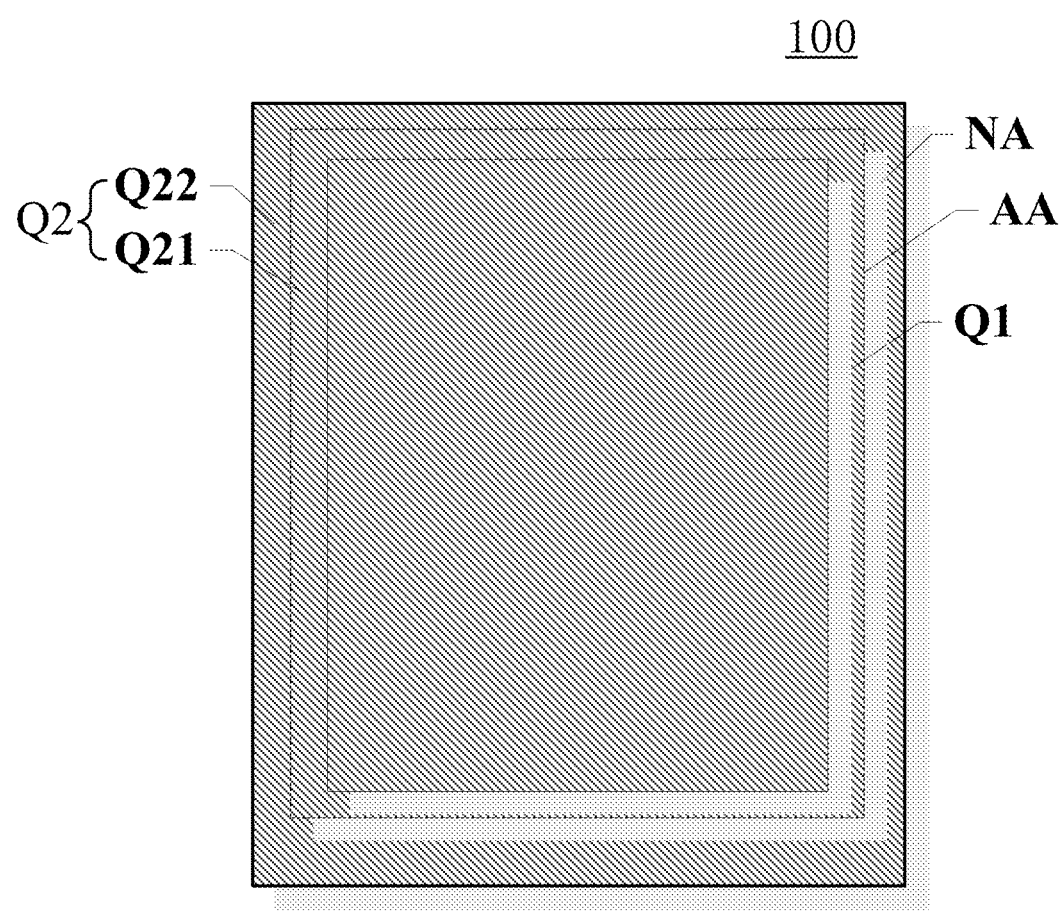
FIG. 15 illustrates another planar view of an exemplary display module according to various disclosed embodiments of the present disclosure.
Figure 16:
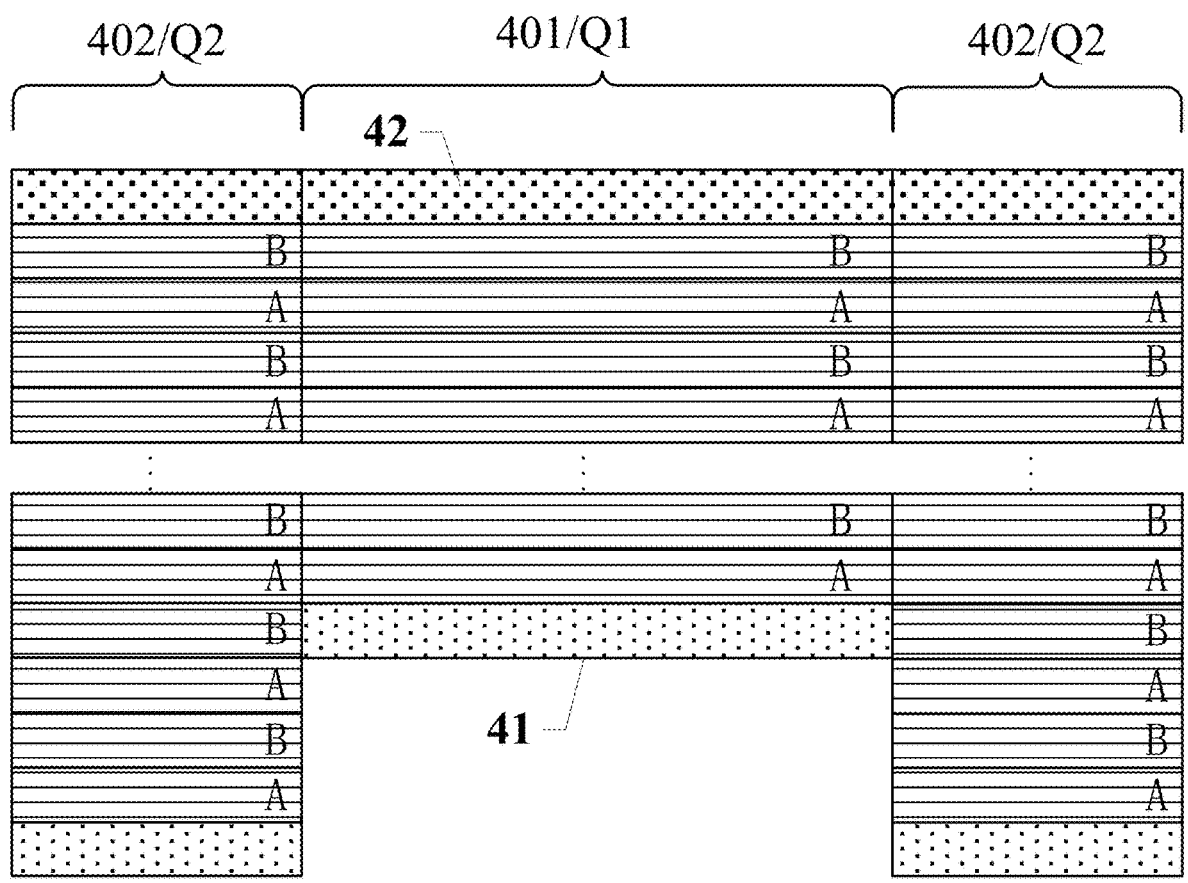
FIG. 16 illustrates another exemplary layer structure of a composite optical film of a display module according to various disclosed embodiments of the present disclosure.

FIG. 15 is a schematic plan view of another exemplary display module according to various disclosed embodiments of the present disclosure, and FIG. 16 is a schematic view of another exemplary film layer of the composite optical film in the display module provided by the embodiment of the present disclosure. As shown in FIG. 15 and FIG. 16, in one embodiment of the present disclosure, the display module may include a first area Q1 and a second area Q2, and the second area Q2 may be in the periphery of the first area Q1. The portion of the composite optical film 40 located in the first area Q1 may be a first sub-composite optical film 401, and the portion of the optical film 40 located in the second area Q2 may be a second sub-composite optical film 402. The total number of the first optical layers A and the second optical layers B included in the first sub-composite optical film 401 may be $N_{11}$, the total number of the first optical layers A and the second optical layers B included in the second sub-composite optical film 402 may be $N_{22}$, and $N_{11} < N_{22}$.

In one embodiment, when the display module includes a display area AA and a non-display NA at least partially surrounding the display area AA, the first area Q1 mentioned in the embodiment of the present disclosure may refer to a portion of the display area AA. The second area Q2 may include a first sub-area Q21 and a second sub-area Q22. The first sub-area Q21 may be located in the display area AA, the second sub-area Q22 may be located in the non-display area, and the first sub-area Q21 and the second sub-area Q22 may be adjacent.

Specifically, when the display module includes the first area Q1 and the second area Q2 disposed on the periphery of the first area Q1, because the second area Q2 may be closer to the edge of the display module, a light leakage may occur. For this reason, in one embodiment of the present disclosure, a differential design may be carried out between the portion of the composite optical film 40 located in the first area Q1 and the portion located in the second area Q2. Assuming that the portion of the same composite optical film 40 located in the first area Q1 is the first sub-composite optical film 401, the portion located in the second area Q2 is the second sub-composite optical film 402, the first sub-composite optical film 401 and the second sub-composite optical film 402 may both include the first optical layer A and the second sub-composite optical film B that are alternately stacked. At this time, the total number of the first optical layers A and the second optical layers B included in the second sub-composite optical film 402 may be limited to be greater than the total number of the first optical layers A and the second optical layers B included in the first sub-composite optical film 401. Accordingly, when the light of the backlight module 10 hits the second area Q2, compared with the first area Q1, the light may endure the transmission and reflection of a larger number of first optical layers A and second optical layer B, more S-polarized light may be reflected back into the backlight module 10, thereby reducing the amount of light leakage in the second area Q2 and reducing the possibility of light leakage in the peripheral areas of the display module. Therefore, the overall display effect of the display module may be improved.

In one embodiment, the thickness of each first optical layer A included in the same composite optical film 40 may be same, and the thickness of each second optical layer B may also be same. In some embodiment, the thicknesses of the first optical layer A and the second optical layer B may be different, which is not specifically limited in the present disclosure.

It should be noted that when the total number of the first optical layers A and the second optical layers B included in the composite optical film 40 in the first area Q1 and the second area Q2 are differentially designed, in one embodiment, the light-exiting surfaces of the first sub-composite optical film 401 in the first region Q1 and the second sub-composite optical film 402 in the second region Q2 may be coplanar. For example, when the film layer of the first sub-composite optical film 401 and the second sub-composite optical film of the film 402 closest to the display liquid crystal cell 30 is the diffusion layer 42, the diffusion layer 42 in the first region Q1 and the second region Q2 may be coplanar.

It should be noted that the embodiment in FIG. 16 shows the difference in the number of the first optical layer A and the second optical layer B included in the first composite optical film 41 and the second composite optical film 42 in the form of a step difference, but it does not represent the actual thickness difference between the first sub-composite optical film 401 and the second sub-composite optical film 402.

Further, referring to FIG. 16, when differentially designing the composite optical film 40 in the first area Q1 and the second area Q2, the first sub-composite optical film 401 located in the first area Q1 and the second sub-composite optical film 402 located in the second area Q2 may be embodied as independent composite optical films 40 respectively disposed in the first area Q1 and the second area Q2. For example, the same group of composite optical films 40 may be formed by the first sub-composite optical film located in the first area Q1 spliced with the second sub-composite optical film 402 located in the second region Q2.

Figure 17:
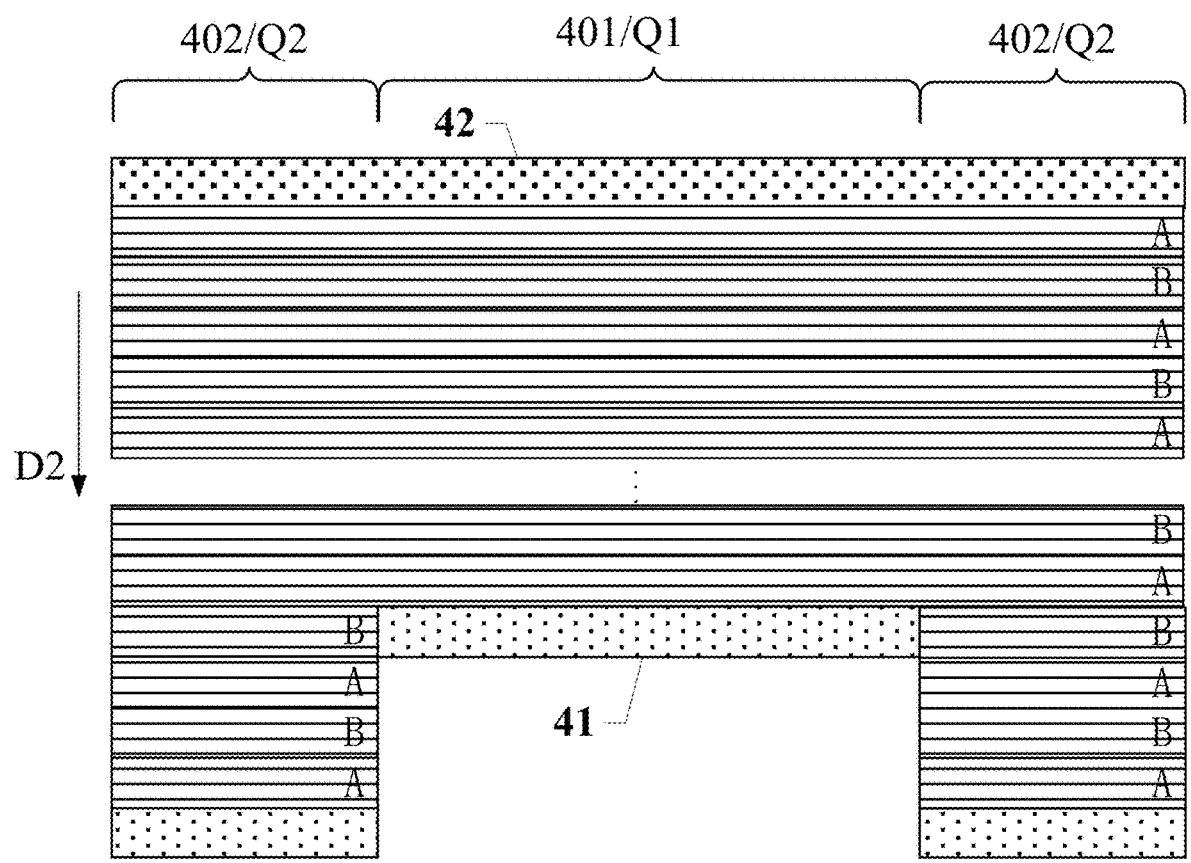
FIG. 17 illustrates another exemplary layer structure of a composite optical film of a display module according to various disclosed embodiments of the present disclosure.

FIG. 17 is a schematic diagram of another exemplary film layer structure of the composite optical film 40 in the display module provided by one embodiment of the present disclosure. As shown in FIG. 17 and referring to FIGS. 7-10, in one embodiment of the present disclosure, along the direction D2 where the display liquid crystal cell 30 points to the backlight module 10, the m-th first optical layer A in the first sub-composite optical film 401 and the m-th layer of first optical layer A in the second sub-composite optical film 402 may be an integrated structure, the m-th layer of second optical layer B in the first sub-composite optical film 401 and the m-th layer of second optical layer B in the second sub-composite optical film 402 may be an integrated structure. $1 \leq m \leq N_{11}/2$, and m may be an integer.

Specifically, when differentially designing the portions of the composite optical film 40 located in the first area Q1 and the second area Q2 in the display module, the optical layer in the first sub-composite optical film 401 may be combined with a partial optical layer in the second sub-composite optical film 402 to form the integrated structure. For example, along the direction D2 of the display liquid crystal cell 30 pointing to the backlight module 10, when the first layer optical layer is the first optical layer A, the first optical layer A may simultaneously cover the first area Q1 and the second area Q2, and when the second layer optical layer is the second optical layer B, the second optical layer B may also cover the first area Q1 and the second area Q2 at the same time. If the total number $N_{11}$ of the first optical layer A and the second optical layer B included in the first region Q1 is an even number, then from the first layer first optical layer A to the $N_{11}/2$-th layer of first optical layer A, each layer of first optical layer A may all be integrated structures covering the first area Q1 and the second area Q2 at the same time; and from the first layer second optical layer B to the $N_{11}/2$-th layer of second optical layer B, each second optical layer B may be integrally formed to cover the first area Q1 and the second area Q2 at the same time. Thus, the phenomenon of uneven light output caused by splicing errors between different film layers may be avoided. Accordingly, the uniformity of light treatment by the composite optical film 40 in the first region Q1 and the second region Q2 may be improved, and the overall light uniformity of the display module may be improved.

Figure 18:
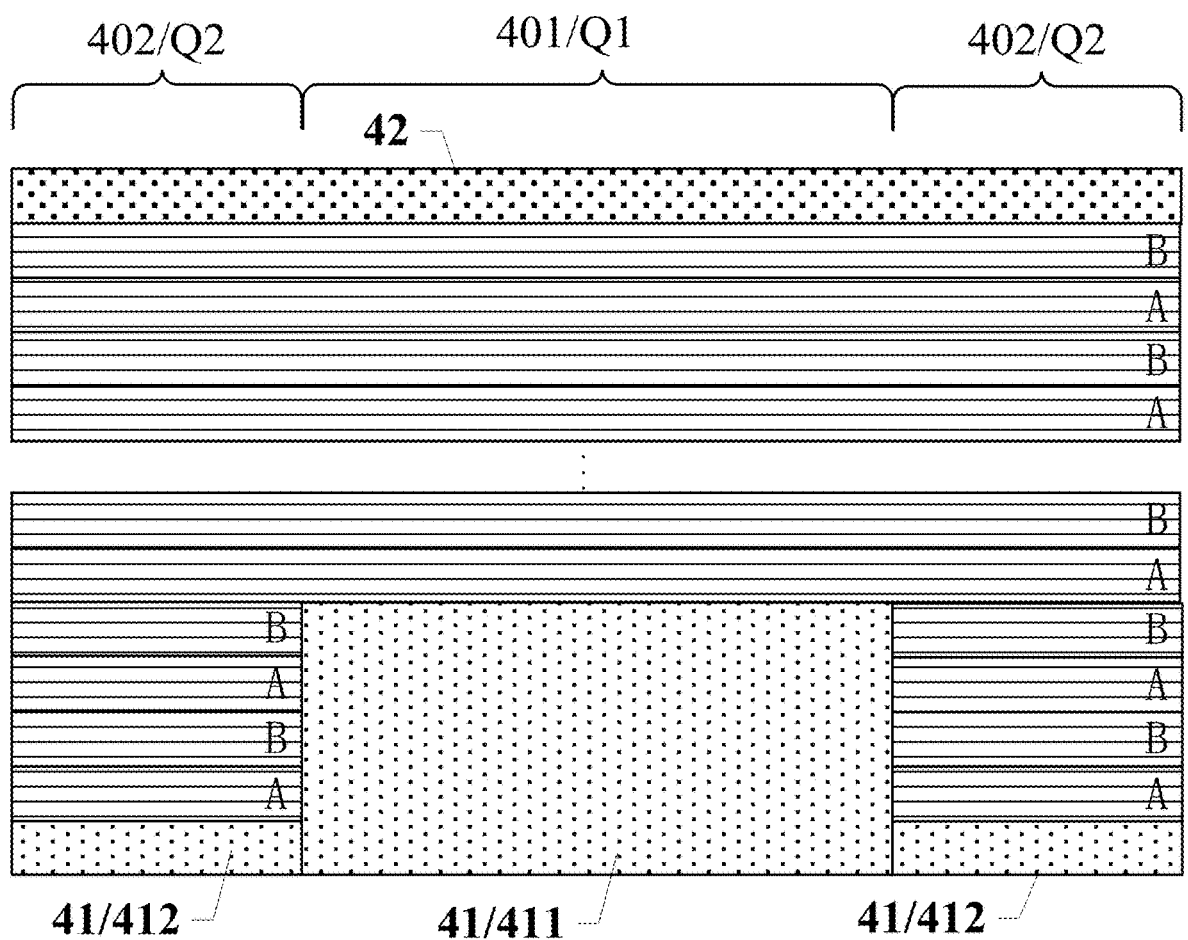
FIG. 18 illustrates another exemplary layer structure of a composite optical film of a display module according to various disclosed embodiments of the present disclosure.

FIG. 18 is a schematic diagram of another exemplary layer stricture of the composite optical film 40 in the display module provided by one embodiment of the present disclosure. As shown in FIG. 18, in one embodiment, the first sub-composite optical film 401 may include a first protective layer 411, the second sub-composite optical film 402 may include a second protective layer 412, and the first optical layer A and the second optical layer B may be disposed on a side of the first protective layer 411 or the second protective layer 412 facing away from the backlight mode 10. The thickness of the first protective layer 411 may be greater than the thickness of the second protective layer 412.

In one embodiment, the thicknesses of each first optical layer A in the composite optical film 40 may be same, and the thicknesses of each second optical layer B may be same. When the total number of the first optical layers A and the second optical layers B included in the second sub-composite optical film 402 is greater than the total number of the first optical layers A and the second optical layers B included in the first sub-composite optical film 401, and the light-exiting surfaces of the first sub-composite optical film 401 and the second sub-composite optical film 402 are coplanar, there may be a height difference between the first protective layer 411 and the second protective layer 412. For this reason, one embodiment of the present disclosure may increase the thickness of the first protective layer 411 in the first sub-composite optical film 401, making it larger than the thickness of the second protective layer 412 in the second composite optical film 402. The thicknesses of the first protective layer 411 and the second protective layer 412 may be designed differently such that the surface of the first protective layer 411 facing the backlight module 10 may be coplanar with the surface of the first protective layer 411 facing the backlight module 10. Such a configuration may be beneficial to ensure that the overall light incident surface of the composite optical film 40 may be on the same plane, thereby helping to ensure that the first optical layer A and the second optical layer B in different regions may be better supported by the protective layer 41.

Figure 19:
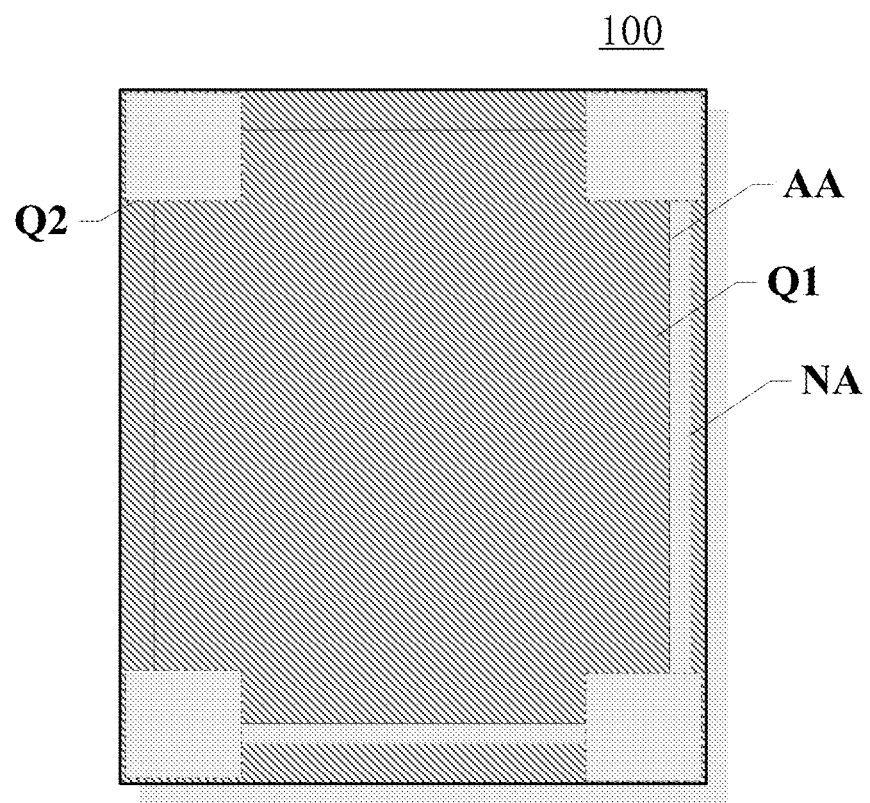
FIG. 19 illustrates another planar view of an exemplary display module according to various disclosed embodiments of the present disclosure.

FIG. 19 is another exemplary schematic plan view of the display module provided by one embodiment of the present disclosure. In one embodiment, referring to FIG. 15, the second area Q2 may surround the first area Q1. In another embodiment, as shown in FIG. 19, the display module may be rectangular, and the second area Q2 may be located at the corner of the display module. The second area Q2 located at the corner may include a portion of the display area AA and a portion of the non-display area NA.

Because the peripheral area of the display module may be prone to have light leakage, the second area Q2 surrounding the first area Q1 may be defined as the peripheral area in the embodiment shown in FIG. 15. The total number of the first optical layers A and the second optical layers B in the peripheral area may be set to be greater than the total number of the first optical layers A and the second optical layers B included in the composite optical film 40 in the first region Q1 to avoid the display light leakage that may occur in the peripheral area of the display module.

When the outline structure of the display module is rectangular, for example, referring to FIG. 19, the phenomenon of the light leakage may be most likely to occur in the corner area of the rectangle. The corner area may be defined as the second area Q2, and only the total number of the first optical layers A and the second optical layers B included in the composite optical film 40 in the corner area may be set to be greater, which may also be able to reduce light leakage phenomenon purposely.

Figure 20:
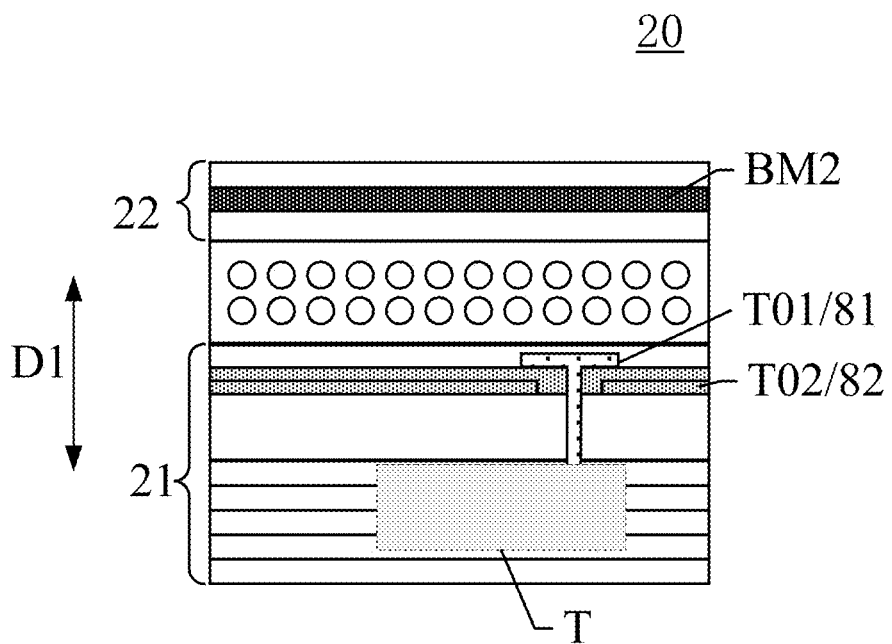
FIG. 20 illustrates a layer structure of an exemplary light control cell according to various disclosed embodiments of the present disclosure.
Figure 21:
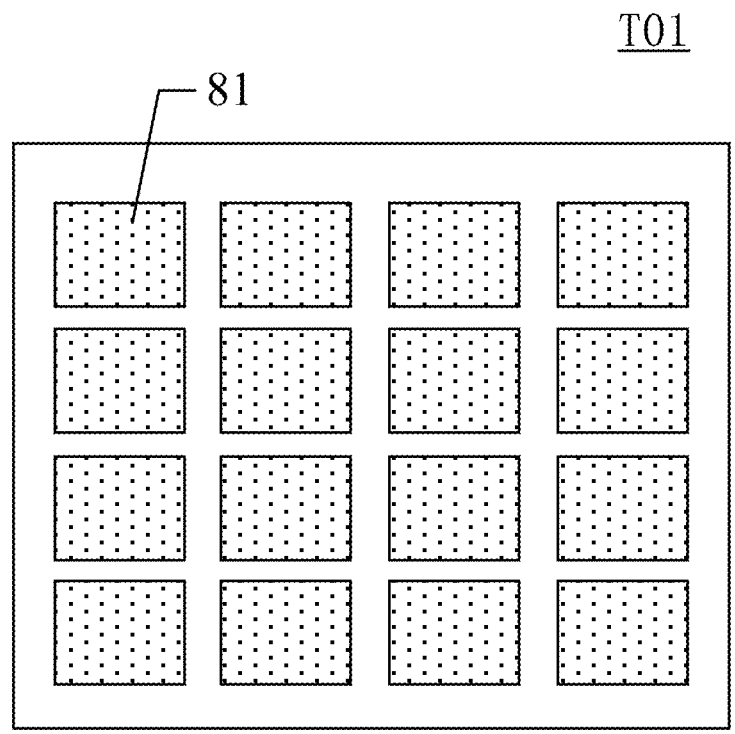
FIG. 21 illustrates a first electrode on a first electrode layer of an exemplary light control cell according to various disclosed embodiments of the present disclosure.
Figure 22:
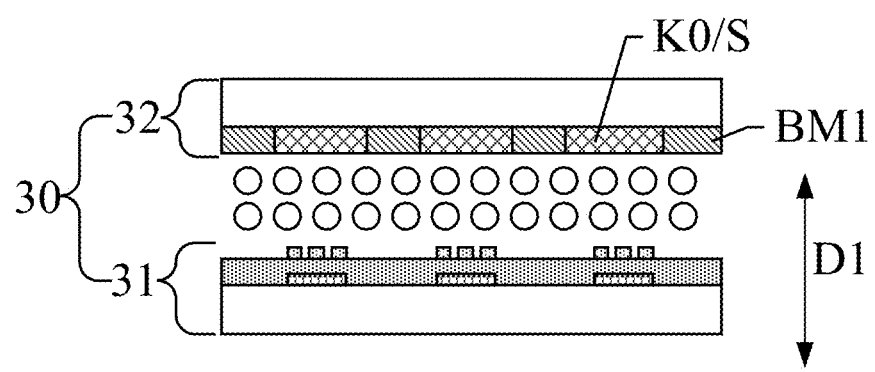
FIG. 22 illustrates a layer structure of an exemplary display liquid crystal cell according to various disclosed embodiments of the present disclosure.
Figure 23:
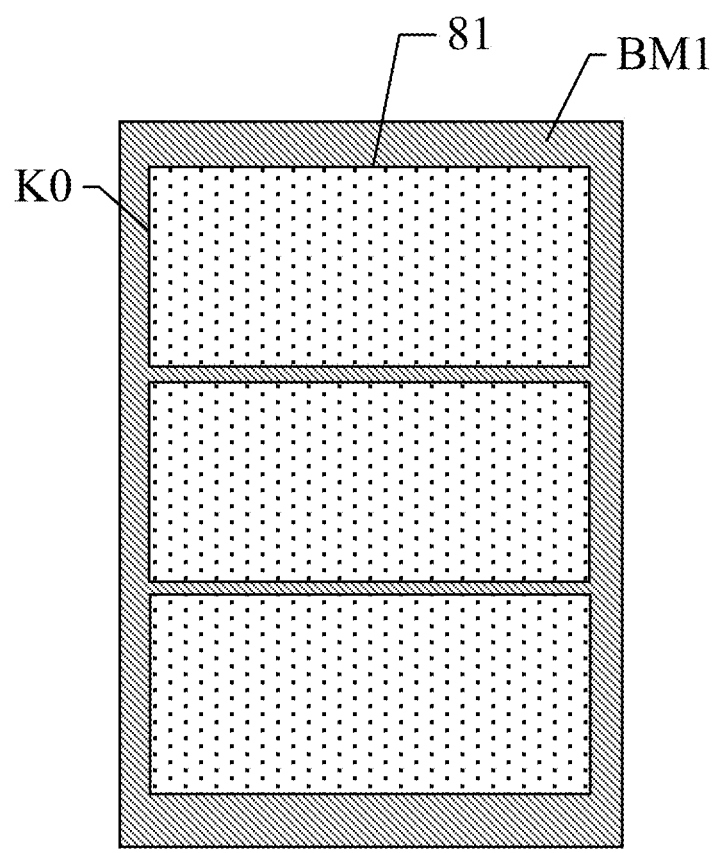
FIG. 23 illustrates an exemplary positional relationship between a black matrix included in a color film substrate of a display liquid cell and a first electrode of a light control cell according to various disclosed embodiments of the present disclosure.

FIG. 20 is a schematic diagram of an exemplary film layer structure of the light control cell 20 provided by one embodiment of the present disclosure. FIG. 21 is a schematic structural diagram of an exemplary first electrode 81 on the first electrode layer T01 in the light control cell 20. The number and the size of the first electrodes 81 included in the first electrode layer T01 are not limited. FIG. 22 is a schematic diagram of an exemplary film layer structure of a liquid crystal display cell provided by an embodiment of the present disclosure, and FIG. 23 illustrates a positional relationship between a black matrix BM1 included in a color filter substrate 32 of a liquid crystal display cell 30 and a first electrode 81 in a light control cell 20, which does not limit the size and quantity of the pixel openings K0 included in the black matrix BM1.

As shown in FIGS. 20-23, in one embodiment of the present disclosure, the light control cell 20 may include a first substrate 21 and a second substrate 22 that are oppositely arranged and a liquid crystal layer filled between the first substrate 21 and the second substrate 22. The first substrate 21 may include a transistor T, and the light control cell 20 may also include a first electrode layer T01 and a second electrode layer T02 oppositely arranged. The first electrode layer T01 may include a plurality of first electrodes 81 arranged as an array. The second electrode layer T02 may include a second electrode 82. The first electrode 81 may be located on the first substrate 21 and electrically connected to the transistor T, and the second electrode 82 may be located on the first substrate 21 or the second substrate 22 and receive a constant potential signal.

The display liquid crystal cell 30 may include an array substrate 31 and a color filter substrate 32 disposed opposite to each other, and a liquid crystal layer may be filled between the array substrate 31 and the color filter substrate 32. The color filter substrate 32 may be located on the side of the array substrate 31 facing away from the backlight module 10. The substrate 32 may include a black matrix BM1, and the black matrix BM1 may include a plurality of pixel openings K0. At least a portion of the pixel openings K0 may be filled with color resists S. The pixel openings K0 may pass through the black matrix BM1 along the thickness direction of the black matrix BM1. Along the first direction D1, a same first electrode 81 may overlap at least one pixel opening K0.

It should be noted that although the light control cell 20 provided by the embodiment of the present disclosure may also be a liquid crystal cell structure, there may be no film layer, such as color resistance, on it. The first electrode layer T01 and the second electrode layer T02 may be disposed between the first electrode T01 and the second electrode T02 of the light control cell. By applying electrical signals between the first electrode 81 and the second electrode 82 on the first electrode layer T01 and the second electrode layer T02, the first electrode 81 and the second electrode 82 may form a voltage to drive liquid crystal to deflect. Because the first electrode layer T01 may include a plurality of block-shaped first electrodes 81, the deflection of the liquid crystal in the area corresponding to the first electrodes 81 may be controlled by controlling the signals supplied to the first electrodes 81. The corresponding area of each first electrode 81 may be regarded as an area where the deflection of the liquid crystal may be individually adjusted such that the light control cell 20 may realize the divisional control of the light emitted by the backlight module 10. In one embodiment the first electrode 81 may be electrically connected to the transistor T, and the electrical signals may be obtained through the transistor T.

The color filter substrate 32 included in the display liquid crystal cell 30 may be provided with a black matrix BM1. The black matrix BM1 may include pixel openings K0 that allow light to pass through. In one embodiment, at least a portion of the pixel openings K0 may be filled with color resists S. For example, some of the pixel openings K0 may be filled with red color-resist, some of the pixel openings K0 may be filled with green color-resist, and some of the pixel openings K0 may be filled with blue color-resist. When the light passes through these color-resistors S, the color display of the liquid crystal cell 30 may be realized. The aforementioned pixel opening K0 may be an area that allows light to pass through, and the area blocked by the black matrix BM1 may be an area that light cannot pass through. According to the embodiment of the present disclosure, along the first direction D1, the first electrode 31 in the light control cell 20 may overlap with at least one pixel opening K0. Because the first electrode 31 may adjust the deflection of the liquid crystal in its corresponding area, the light in the region of the pixel opening K0 overlapping with the first electrode 31 may be regulated, thereby realizing the divisional dimming of the display liquid crystal cell 30, for example, making the region that needs to be in a black state darker. Accordingly, the contrast and display effects of the display liquid crystal cell 30 may be effectively improved.

Figure 24:
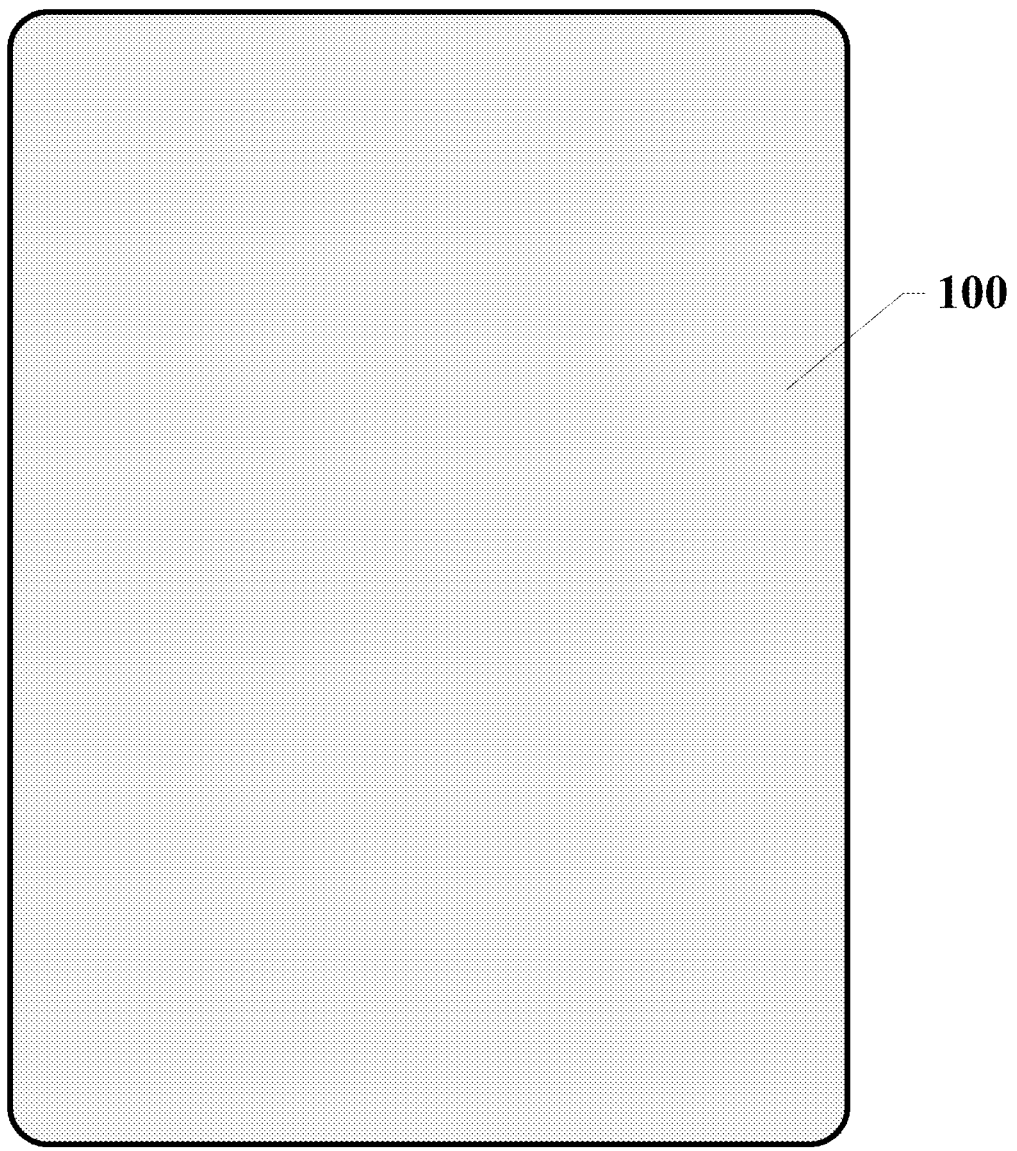
FIG. 24 illustrates an exemplary display device according to various disclosed embodiments of the present disclosure.

The present disclosure also provides a display device. FIG. 24 is a schematic structural view of an exemplary display device provided by one embodiment of the present disclosure. As shown in FIG. 24, an exemplary display device provided by one embodiment of the present disclosure may include a display module provided in any one of the above-mentioned embodiments, or other appropriate display module.

It can be understood that the display device provided in the present disclosure may be a mobile phone, a tablet, a computer, a television, a vehicle display device and other display devices with a display function, and the present disclosure does not specifically limit this. The display device provided by the present disclosure may include the beneficial effects of the display module provided by the embodiments of the present disclosure; and the details may be referred to the specific descriptions of the above-mentioned embodiments for the anti-peeping display module.

It can be known from the above embodiments that the display module and the display device provided by the present disclosure may at least achieve the following beneficial effects.

In the display module and the display device provided by the embodiments of the present disclosure, a light control cell and a display liquid crystal cell may be disposed on the light-exiting surface of the backlight module. The light control cell may be disposed between the backlight module and the display liquid crystal cell. The light emitted by the backlight module may be adjusted and controlled by the introduced light control cell. When the light regulated by the light control cell is transmitted to the display liquid crystal cell, the black state picture displayed by the display liquid crystal cell may be made blacker, thus effectively improve the contrast of the display liquid crystal cell. Accordingly, the display effect of the display liquid crystal cell may be enhanced. The present disclosure may introduce a composite optical film between the display liquid crystal cell and the backlight module. The composite optical film may be configured to transmit the P-polarized light and reflect the S-polarized light, and the reflected S-polarized light may be reflected back to the backlight module. The polarization direction of the light reflected by the backlight module may be changed and may be decomposed to form the P-polarized light and the S-polarized light and irradiate the composite optical film. Through such a cycle, the intensity of the light emitted by the backlight module may be greatly improved, and the amount of light emitted from the composite optical film may be increased. While improving the contrast of the product, the introduction of the composite optical film may also be conducive to improving the transmittance of the display module, thus effectively improving the display effect of the display product.

Although some specific embodiments of the present disclosure have been described in detail through examples, those skilled in the art should understand that the above examples are for illustration only and not intended to limit the scope of the present disclosure. Those skilled in the art will appreciate that modifications can be made to the above embodiments without departing from the scope and spirit of the disclosure; and the scope of the disclosure is defined by the appended claims.

What is claimed is:

1. A display module, comprising:
a backlight module; a light control cell; a display liquid crystal cell; a first polarizer; a second polarizer; and a composite optical film, wherein:
along a first direction, the light control cell is disposed between the backlight module and the display liquid crystal cell and on a light-exiting surface of the backlight module, the first direction being a thickness direction of the display module;
the first polarizer is disposed on a side of the display liquid crystal cell facing away from the light control cell;
the second polarizer is disposed between the display liquid crystal cell and the light control cell;
the composite optical film is disposed between the display liquid crystal cell and the backlight module;
a transmission axis of the first polarizer is perpendicular to a transmission axis of the second polarizer; and
the composite optical film is configured to transmit P-polarized light and reflect S-polarized light, wherein:
the composite optical film further comprises:
a diffusion layer;
a protective layer without diffusion function and reflecting function, wherein along the first direction, a first optical layer and a second optical layer are alternately disposed along the first direction between the protective layer and the diffusion layer, and the protective layer is located between the diffusion layer and the backlight module, and wherein the backlight module reflects the S-polarized light reflected by the composite optical film; and
a first composite optical film and a second composite optical film,
wherein the first composite optical film is located between the light control cell and the backlight module; the second composite optical film is located between the display liquid crystal cell and the light control cell; a transmission axis of the first composite optical film is parallel to the transmission axis of the first polarizer; a transmission axis of the second composite optical film is parallel to the transmission axis of the second polarizer; a total number of the first optical layers and the second optical layers included in the first composite optical film is N1; a total number of the first optical layers and the second optical layers included in the second composite optical film is N2; and N1>N2.

2. The display module according to claim 1, wherein:
a refractive index of the first optical layer is n1;
a refractive index of the second optical layer is n2; and
$|n1-n2| \geq 0.05$.

3. The display module according to claim 1, wherein:
in the same composite optical film, a total number of first optical layers and second optical layers is N, $200 \leq N \leq 400$, and N is an integer.

4. The display module according to claim 1, comprising:
at least one set of composite optical films disposed between the light control cell and the backlight module, wherein a transmission axis of one of the at least one set of composite optical film is perpendicular to the transmission axis of the second polarizer.

5. The display module according to claim 4, further comprising:
a third polarizer disposed between the second polarizer and the light control cell, wherein a transmission axis of the third polarizer is parallel to the transmission axis of the second polarizer.

6. The display module according to claim 1, wherein:
the second composite optical film is located between the display liquid crystal cell and the second polarizer; or
the second composite optical film is located between the second polarizer and the light control cell.

7. The display module according to claim 1, comprising:
at least one set of composite optical films and a third polarizer,
wherein the at least one set of composite optical films are located between the display liquid crystal cell and the light control cell;
the third polarizer is located between the light control cell and the backlight module;
a transmission axis of the at least one set of composite optical films is parallel to the transmission axis of the second polarizer; and
a transmission axis of the third polarizer is parallel to the transmission axis of the first polarizer.

8. The display module according to claim 7, wherein:
the composite optical film is located between the display liquid crystal cell and the second polarizer; or
the composite optical film is located between the second polarizer and the light control cell.

9. The display module according to claim 1, wherein:
the backlight module does not include the diffusion layer.

10. The display module according to claim 1, comprising:
a first area; and
a second area,
wherein:
the second area is in a periphery of the first area;
a portion of the composite optical film located in the first area includes a first sub-composite optical film;
a portion of the composite optical film located in the second area includes a second sub-composite optical film;
a total number of the first optical layers and the second optical layers included in the first sub-composite optical film is $N_{11}$;
a total number of the first optical layers and the second optical layers included in the second sub-composite optical film is $N_{22}$; and
$N_{11} < N_{22}$.

11. The display module according to claim 10, wherein:
along a direction where the display liquid crystal cell points to the backlight module, an m-th first optical layer in the first sub-composite optical film and an m-th first optical layer in the second sub-composite optical film are an integrated structure and an m-th second optical layer in the first sub-composite optical film and an m-th second optical layer in the second sub-composite optical film are an integrated structure; and
$1 \leq m \leq N_{11}/2$, and m is an integer.

12. The display module according to claim 10, wherein:
the first sub-composite optical film includes a first protective layer;
the second sub-composite optical film includes a second protective layer;
the first optical layer and the second optical layer are disposed on a side of the first protective layer or the second protection layer facing away from the backlight module; and
a thickness of the first protective layer is greater than a thickness of the second protective layer.

13. The display module according to claim 10, wherein:
the second area surrounds the first area; or
the display module is rectangular, and the second area is located at a corner of the display module.

14. The display module according to claim 1, wherein:
the light control cell includes a first substrate and a second substrate arranged oppositely and a liquid crystal layer filled between the first substrate and the second substrate, the first substrate includes a transistor;
the light control cell also includes a first electrode layer and a second electrode layer arranged oppositely;
the first electrode layer includes a plurality of first electrodes arranged as an array;
the second electrode layer includes a second electrode;
a first electrode of the plurality of first electrodes is located on the first substrate and electrically connected to the transistor,
the second electrode is located on the first substrate or the second substrate and configured to receive a constant potential signal;
the display liquid crystal cell includes an array substrate and a color filter substrate disposed oppositely, and a liquid crystal layer filled between the array substrate and the color filter substrate;
the color filter substrate is disposed on a side of the array substrate facing away from the backlight module;
the color filter substrate includes a black matrix;
the black matrix includes a plurality of pixel openings;
at least a portion of the plurality of pixel openings are filled with a color resist;
along a thickness direction of the black matrix, the plurality of pixel openings penetrate the black matrix; and
along the first direction, a same first electrode of the plurality of first electrodes overlaps with at least one of the plurality of pixel openings.

15. A display device, comprising:
a display module, including: a backlight module; a light control cell; a display liquid crystal cell; a first polarizer; a second polarizer; and a composite optical film, wherein:
along a first direction, the light control cell is disposed between the backlight module and the display liquid crystal cell and on a light-exiting surface of the backlight module, the first direction being a thickness direction of the display module;
the first polarizer is disposed on a side of the display liquid crystal cell facing away from the light control cell;
the second polarizer is disposed between the display liquid crystal cell and the light control cell;
the composite optical film is disposed between the display liquid crystal cell and the backlight module;
a transmission axis of the first polarizer is perpendicular to a transmission axis of the second polarizer; and
the composite optical film is configured to transmit P-polarized light and reflect S-polarized light, wherein:

the composite optical film further comprises:
- a diffusion layer;
- a protective layer without diffusion function and reflecting function, wherein along the first direction, a first optical layer and a second optical layer are alternately disposed along the first direction between the protective layer and the diffusion layer, and the protective layer is located between the diffusion layer and the backlight module, and wherein the backlight module reflects the S-polarized light reflected by the composite optical film; and
- a first composite optical film and a second composite optical film,
- wherein the first composite optical film is located between the light control cell and the backlight module; the second composite optical film is located between the display liquid crystal cell and the light control cell; a transmission axis of the first composite optical film is parallel to the transmission axis of the first polarizer; a transmission axis of the second composite optical film is parallel to the transmission axis of the second polarizer; a total number of the first optical layers and the second optical layers included in the first composite optical film is N1; a total number of the first optical layers and the second optical layers included in the second composite optical film is N2; and N1>N2.

* * * * *